US012777455B2

(12) United States Patent
Hirzallah et al.

(10) Patent No.: US 12,777,455 B2
(45) Date of Patent: Oct. 27, 2026

(54) KEY PERFORMANCE INDICATOR REPORTING FOR LOCATION-BASED SERVICES

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 18/460,490

(22) Filed: Sep. 1, 2023

(65) Prior Publication Data

US 2025/0081158 A1 Mar. 6, 2025

(51) Int. Cl.
*H04W 64/00* (2009.01)
*H04W 24/02* (2009.01)
*H04W 24/10* (2009.01)

(52) U.S. Cl.
CPC ......... *H04W 64/006* (2013.01); *H04W 24/02* (2013.01); *H04W 24/10* (2013.01)

(58) Field of Classification Search
CPC .................................................... H04W 63/003
See application file for complete search history.

(56) References Cited

U.S. PATENT DOCUMENTS 9,113,305 B2 * 8/2015 Lim ...................... H04W 4/025
11,125,891 B2 * 9/2021 Kim ........................ G01S 19/34
(Continued)

FOREIGN PATENT DOCUMENTS

WO 2022155093 A1 7/2022
WO WO-2022215015 A1 * 10/2022 .............. G01S 11/04
WO WO-2022226445 A1 * 10/2022 ........... G01S 5/0244

OTHER PUBLICATIONS

Huawei, et al., "Discussion on AI/ML for CSI Feedback Enhancement", 3GPP TSG-RAN WG1 Meeting #113, R1-2304654, 3GPP, Mobile Competence Centre, 650, Route Des Lucioles, F-06921 Sophia-antipolis Cedex, France, vol. 3GPP RAN 1, No. Incheon, Korea, May 22, 2023-May 26, 2023, 31 Pages, May 15, 2023, XP052385187, Section 3.5.2.
(Continued)

*Primary Examiner* — Douglas B Blair
(74) *Attorney, Agent, or Firm* — Procopio, Cory, Hargreaves & Savitch LLP

(57) ABSTRACT

A user equipment (UE) may monitor use of a positioning method by monitoring a key performance indicator (KPI) associated with a location-based service. The UE may receive a set of positioning signals. The UE may measure the set of positioning signals. The UE may receive a set of location-based service signals associated with the location-based service of the UE. The UE may transmit a report including at least one of the KPI associated with the location-based service or a first indicator that the KPI associated with the location-based service is within a failure threshold range. The UE may receive a second indicator to change a positioning method of the UE based on the report. The UE may calculate a location of the UE using the changed positioning method based on the measured set of positioning signals.

29 Claims, 13 Drawing Sheets

(56) References Cited

U.S. PATENT DOCUMENTS

| | | | | |
|---|---|---|---|---|
| 2005/0070306 | A1* | 3/2005 | Kim | H04W 64/00 455/456.2 |
| 2010/0309051 | A1* | 12/2010 | Moshfeghi | G01S 5/0236 342/451 |
| 2017/0126476 | A1* | 5/2017 | Curtin | H04L 41/0631 |
| 2023/0152469 | A1 | 5/2023 | Liu et al. | |
| 2024/0057011 | A1* | 2/2024 | Fakoorian | G01S 5/0236 |
| 2024/0171672 | A1* | 5/2024 | Huang | H04M 1/72457 |
| 2024/0275547 | A1* | 8/2024 | Hirzallah | H04L 5/0051 |
| 2024/0319308 | A1* | 9/2024 | Hirzallah | G01S 5/10 |
| 2025/0071716 | A1* | 2/2025 | Hirzallah | G01S 5/0221 |

OTHER PUBLICATIONS

Huawei., et al., “Discussion on Network-assisted and UE-assisted Integrity”, 3GPP TSG-RAN WG2 Meeting #114-e, R2-2105218, 3GPP, Mobile Competence Centre, 650, Route Des Lucioles, F-06921 Sophia-antipolis Cedex, France, vol. RAN WG2, No. Electronic, May 17, 2021-May 27, 2021, 9 Pages, May 11, 2021, XP052006886, Section 2.

International Search Report and Written Opinion—PCT/US2024/043974—ISA/EPO—Dec. 3, 2024.

Nokia, et al., “Other Aspects on AI/ML for Positioning Accuracy Enhancement”, 3GPP TSG RAN WG1 #110bis-e, R1-2209372, 3GPP, Mobile Competence Centre, 650, Route Des Lucioles, F-06921 Sophia-antipolis Cedex, France, vol. RAN WG1, No. e-meeting, Oct. 10, 2022-Oct. 19, 2022, 17 Pages, Sep. 30, 2022, XP052277291, Sections 2-3.

* cited by examiner

KEY PERFORMANCE INDICATOR REPORTING FOR LOCATION-BASED SERVICES

TECHNICAL FIELD

The present disclosure relates generally to communication systems, and more particularly, to a positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive a set of positioning signals. The apparatus may measure the set of positioning signals. The apparatus may receive a set of location-based service signals associated with a location-based service of the apparatus. The apparatus may transmit a report including at least one of the key performance indicator (KPI) associated with a location-based service or a first indicator that the KPI associated with the location-based service is within a failure threshold range. The apparatus may receive a second indicator to change a positioning method of the apparatus based on the report. The apparatus may calculate a location of the apparatus using the changed positioning method based on the measured set of positioning signals.

In an aspect of the disclosure, a method, a computer-readable medium, and an apparatus are provided. The apparatus may include a network entity. The network entity may include a location management function (LMF). The apparatus may receive a report including at least one of a KPI associated with a location-based service or a first indicator that the KPI associated with the location-based service is within a failure threshold range. The apparatus may transmit a second indicator to change a positioning method based on at least one of the first indicator or a determination that the KPI is within the failure threshold range.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
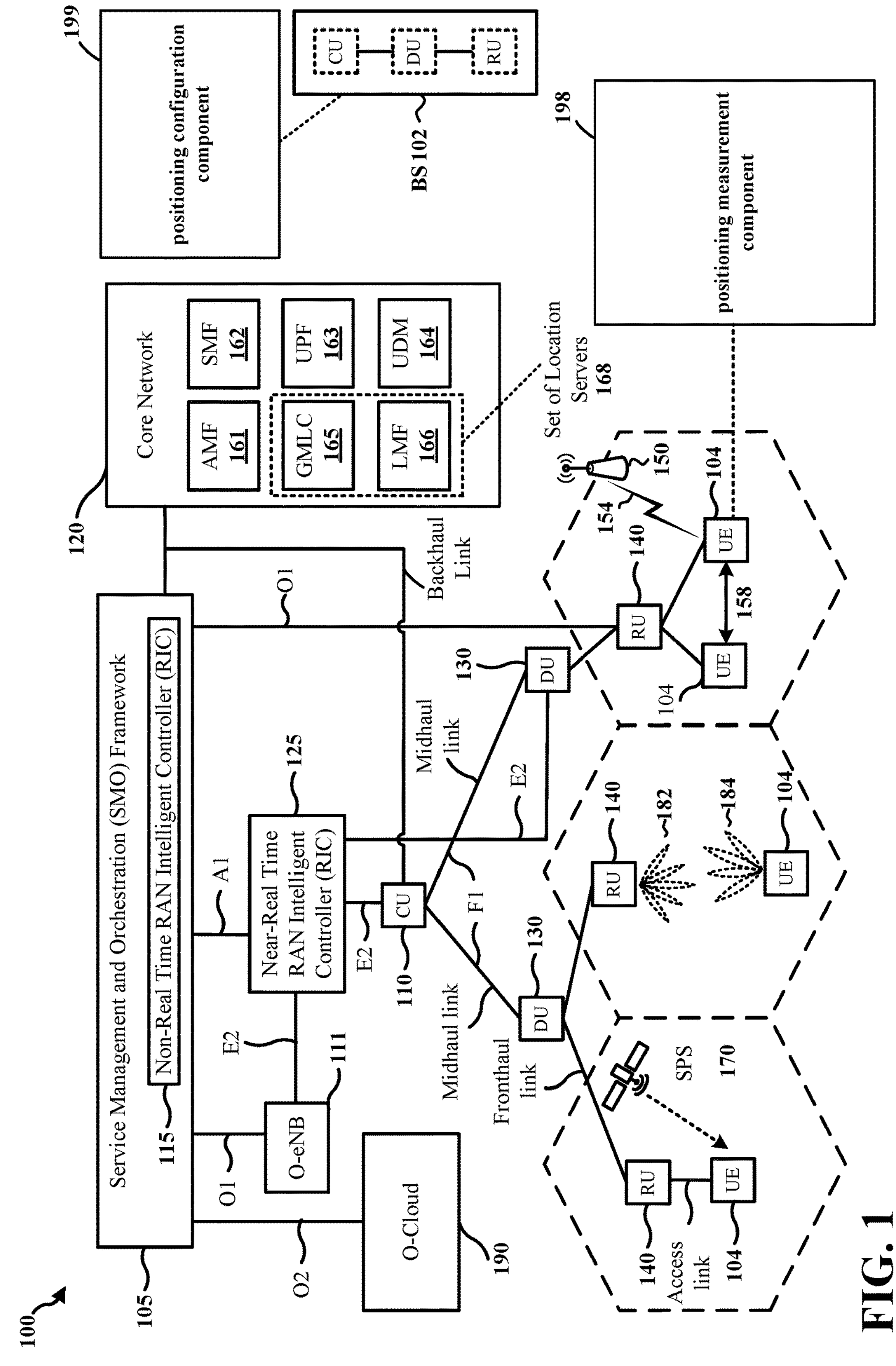
FIG. 1 is a diagram illustrating an example of a wireless communications system and an access network.

The following description is directed to examples for the purposes of describing innovative aspects of this disclosure.

However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless positioning systems. Some aspects more specifically relate to wireless positioning systems that monitor indicators that may influence positioning attributes, such as key performance indicators (KPIs). In some examples, a user equipment (UE) may receive a set of positioning signals. The UE may measure the set of positioning signals. The UE may receive a set of location-based service signals associated with a location-based service of the UE. The UE may transmit a report including at least one of the KPI associated with a location-based service or a first indicator that the KPI associated with the location-based service is within a failure threshold range. A threshold range may be, for example, a range greater or equal to a threshold value (e.g., $x>y$, $x \geq y$), a range less than or equal to a threshold value (e.g., $x<y$, $x \leq y$), or a range between threshold values (e.g., $a<x<b$, $a \leq x<b$, $a<x \leq b$, $a \leq x \leq b$), which may or may not include the threshold value endpoints. The UE may receive a second indicator to change a positioning method of the apparatus based on the report. The UE may calculate a location of the apparatus using the changed positioning method based on the measured set of positioning signals.

In some examples, a network entity, such as a location management function (LMF), may receive a report including at least one of a KPI associated with a location-based service or a first indicator that the KPI associated with the location-based service is within a failure threshold range. The network entity may transmit a second indicator to change a positioning method based on at least one of the first indicator or a determination that the KPI is within the failure threshold range.

In some aspects, KPIs of location dependent services may be affected by erroneous positioning estimates, or may affect erroneous positioning estimates. As a result, such KPIs may provide indicators of high or low performance of positioning methods, such as classical positioning methods or positioning solutions using positioning models, for example artificial intelligence machine learning (AI/ML) positioning models. In some aspects, a positioning device, such as a UE, may report to a network entity, such as an LMF, indicators related to such KPIs. In one aspect, a UE may monitor a KPI of a location-based service and may indicate to the network entity, via a flag, that a location-based service is failing. A location-based service may be any service of a positioning device that uses one or more variables that change if the location of the positioning device changes by more than a minimum threshold amount (e.g., a beam management service, a transmission reception point (TRP) handover service). In another aspect, the positioning device may report the actual KPIs (e.g., throughput, negative acknowledgement (NACK) rates, rate of beam failure) corresponding with the location dependent services. The positioning device may then receive a configuration from the network entity to activate/deactivate/switch a positioning model/method based on the indicator. In some aspects, the network entity may configure the positioning device to monitor a specific location-based service (e.g., location-dependent beam management, activation for AI/ML channel state information (CSI) feedback, AI/ML beam prediction). In some aspects, a network entity may configure the positioning device with various configurations to monitor and report the KPI indicators, for example monitoring conditions, trigger conditions for monitoring, reporting specifics (e.g., periodicity, quantity, reporting content). In some aspects, a positioning device and a network entity may conduct a capabilities exchange for positioning monitoring based on such location-based services Particular aspects of the subject matter described in this disclosure can be implemented to realize one or more of the following potential advantages. In some examples, by configuring a positioning device to report indicators associated with KPIs of location-based services, the described techniques can be used to monitor the positioning device and ensure that the positioning device uses appropriate positioning methods for its location, for example site-specific positioning models or site-specific positioning algorithms. By allowing a network entity to dynamically adjust the positioning model that the positioning device uses to calculate its position, the network entity may improve the accuracy of positioning performed by the positioning device simply by analyzing, and reporting when appropriate, KPIs of location-based services.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUS), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHZ-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHz), and FR5 (114.25 GHZ-300 GHz). Each of these higher frequency bands falls within the EHF band.

With the above aspects in mind, unless specifically stated otherwise, the term “sub-6 GHz” or the like if used herein may broadly represent frequencies that may be less than 6 GHZ, may be within FR1, or may include mid-band frequencies. Further, unless specifically stated otherwise, the term “millimeter wave” or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a positioning measurement component 198 that may be configured to receive a set of positioning signals. The positioning measurement component 198 may be configured to measure the set of positioning signals. The positioning measurement component 198 may be configured to receive a set of location-based service signals associated with the location-based service of the UE 104. The positioning measurement component 198 may be configured to transmit a report including at least one of the KPI associated with the location-based service or a first indicator that the KPI associated with the location-based service is within a failure threshold range. The positioning measurement component 198 may be configured to receive a second indicator to change a positioning method of the UE 104 based on the report. The positioning measurement component 198 may be configured to calculate a location of the UE 104 using the changed positioning method based on the measured set of positioning signals. In certain aspects, the base station 102, the core network 120, the one or more location servers 168, or the LMF 166, may have a positioning configuration component 199 that may be configured to receive a report including at least one of a KPI associated with a location-based service or a first indicator that the KPI associated with the location-based service is within a failure threshold range. The positioning configuration component 199 may be configured to transmit a second indicator to change a positioning method based on at least one of the first indicator or a determination that the KPI is within the failure threshold range. In other words, the positioning measurement component 198 may monitor and report a set of indicators associated with a KPI of a location-based service to the positioning configuration component 199. Based on the set of indicators, the positioning configuration component 199 may indicate to the positioning measurement component 198 a change to its positioning method (e.g., activate a positioning method, deactivate a positioning method, change to a different positioning method). In response to receiving the indication to change the positioning method, the positioning measurement component 198 may perform positioning using the changed positioning method.

Figures 2A, 2B, 2C, 2D:
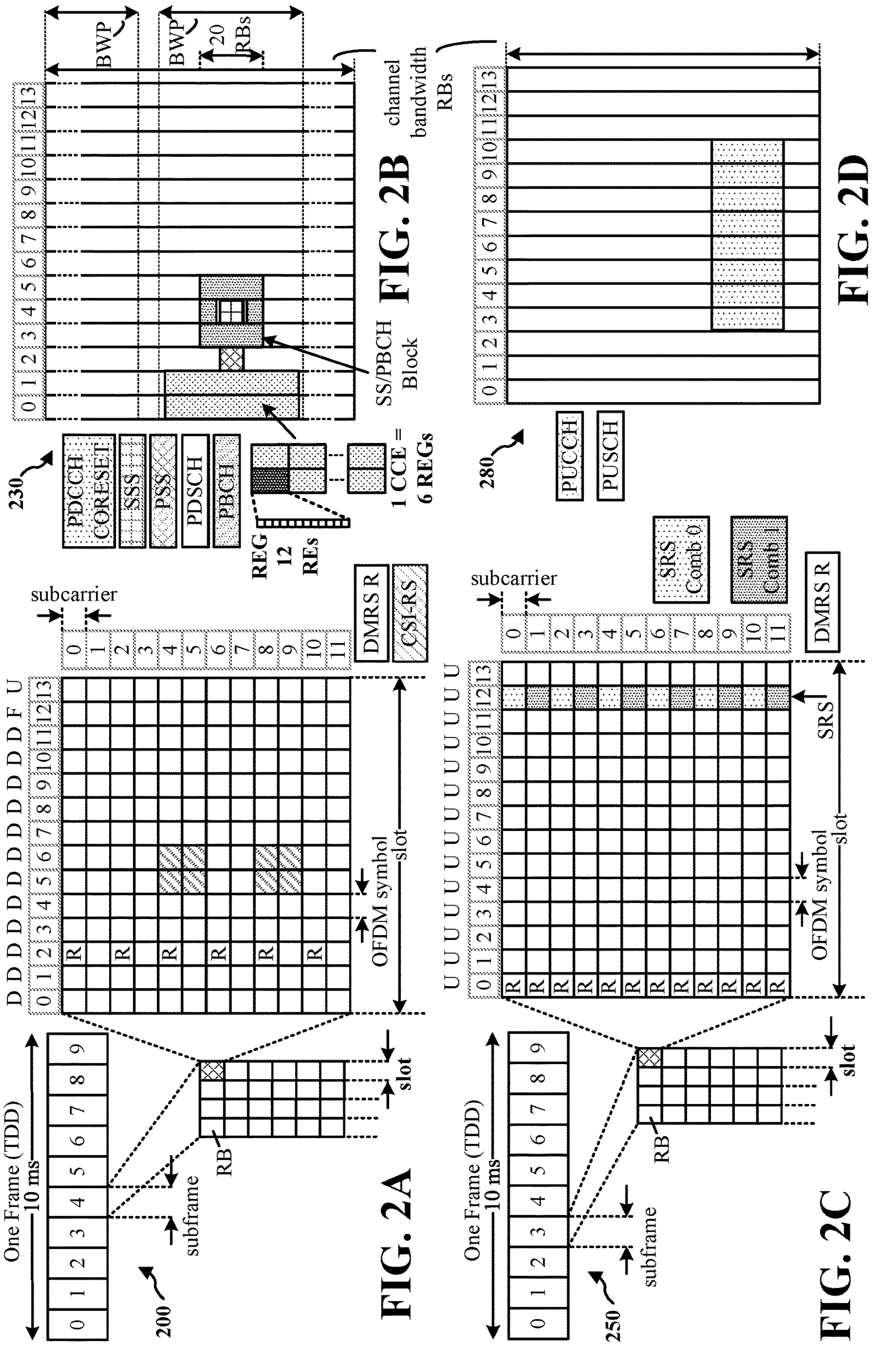
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
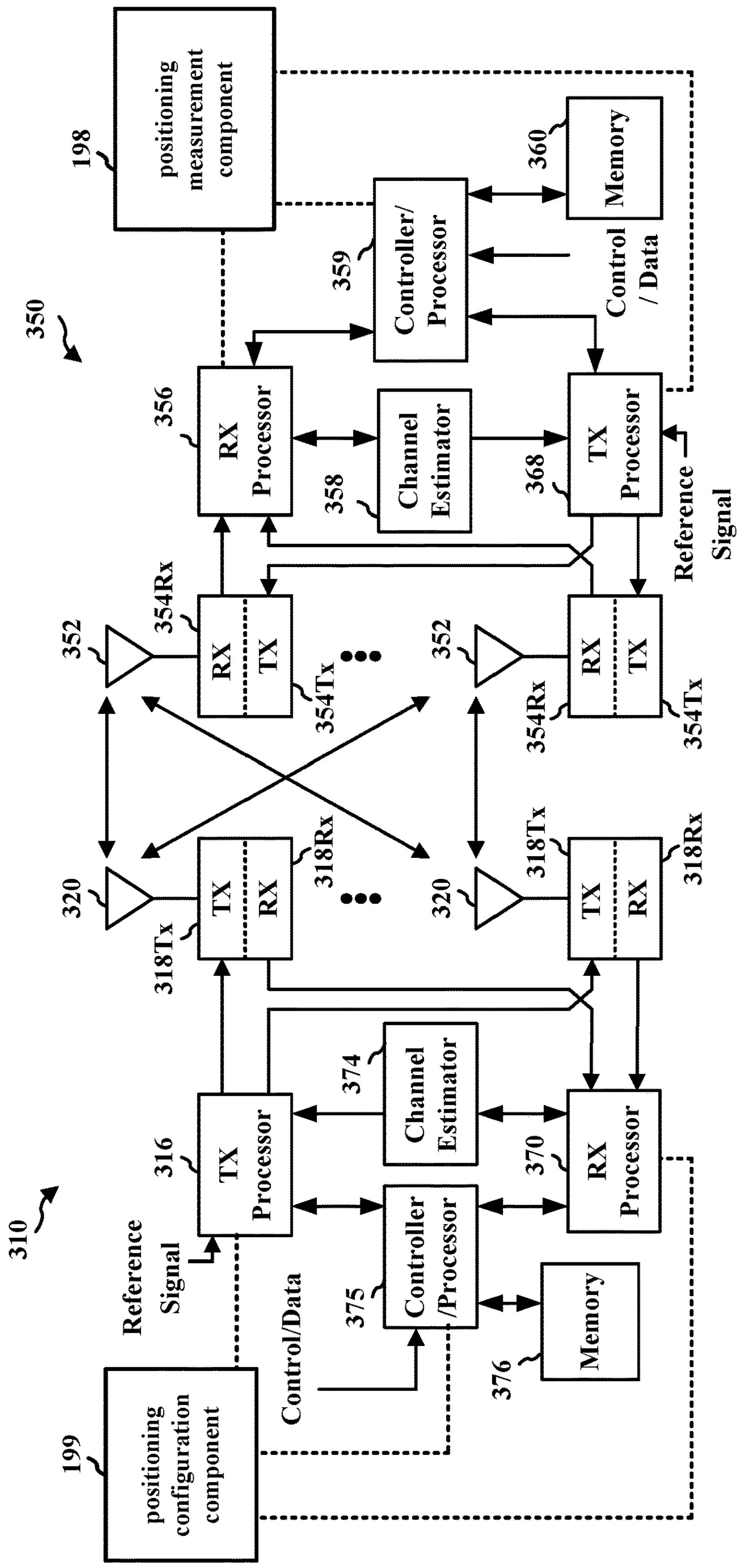
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions, Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning measurement component 198 of FIG. 1.

At least one of the TX processor 316, the RX processor 370, and the controller/processor 375 may be configured to perform aspects in connection with the positioning configuration component 199 of FIG. 1.

Figure 4:
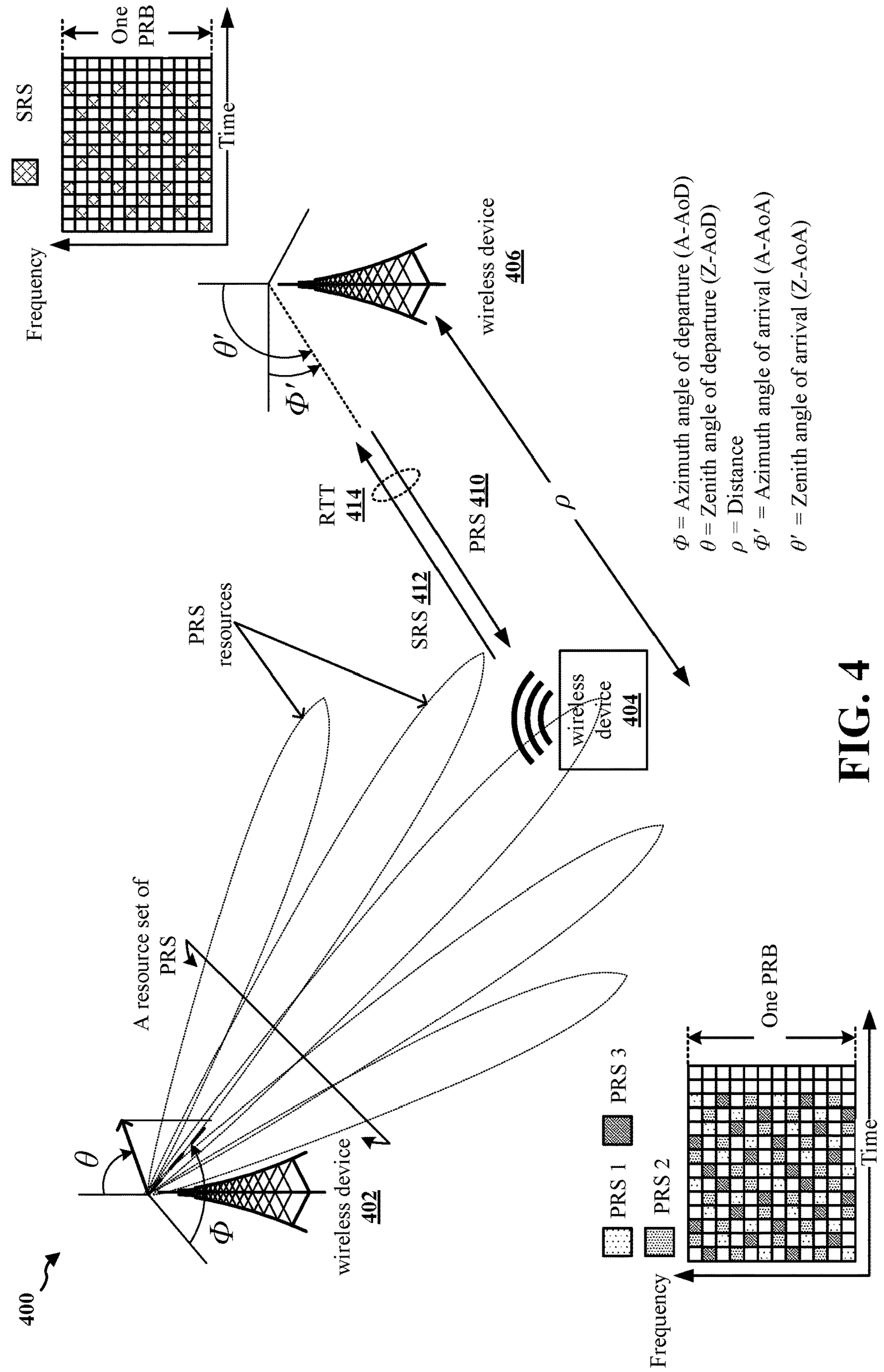
FIG. 4 is a diagram illustrating an example of positioning based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. A location of a wireless device may be defined in terms of measurements on a map, such as latitude, longitude, and/or height from sea level coordinates. A position of a wireless device may be defined in terms of a location of the wireless device, and an orientation of the wireless device, for example a direction an antenna or a panel of the wireless device is facing. The direction may be defined in terms of a vector. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location of the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
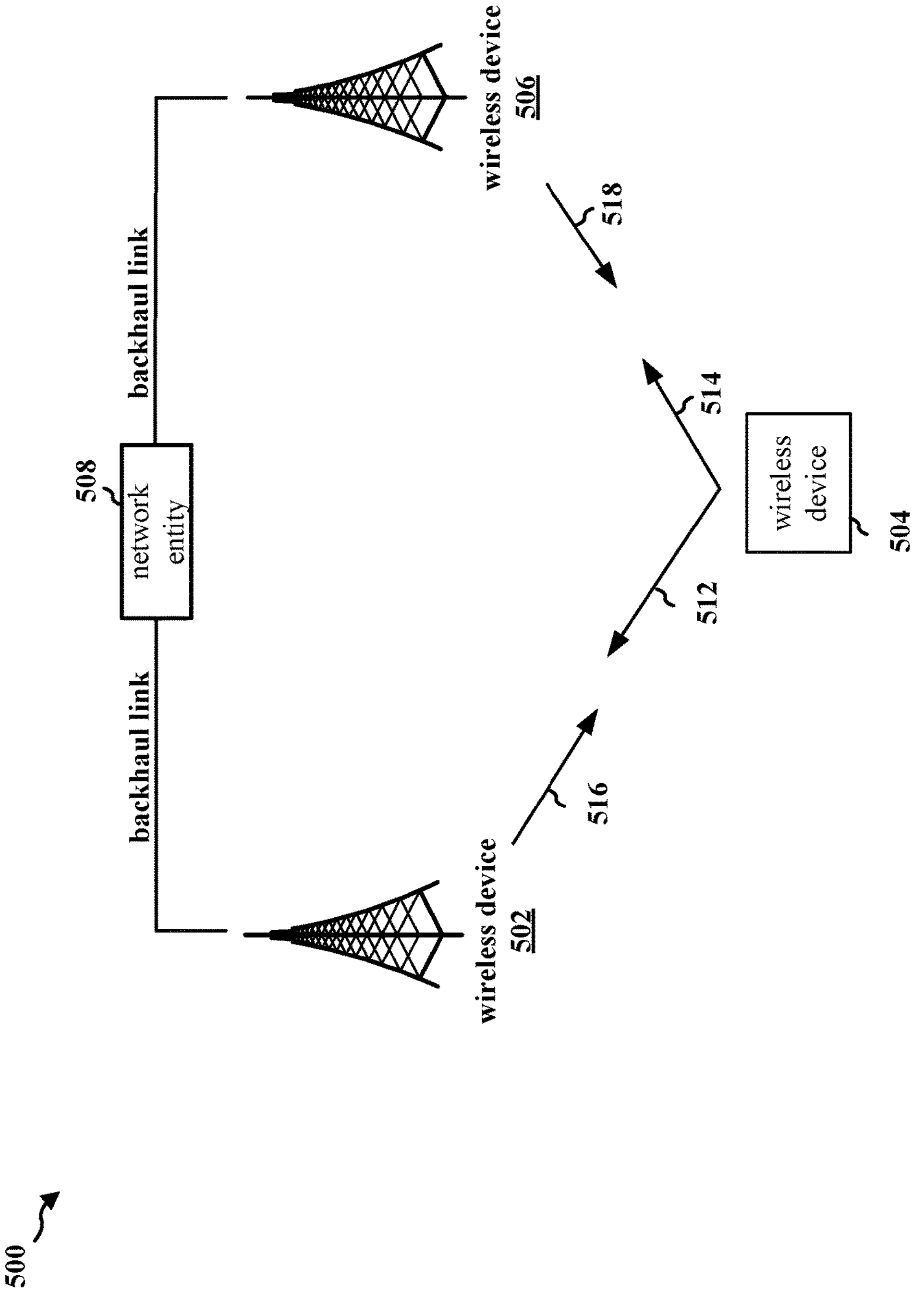
FIG. 5 is a diagram illustrating an example of positioning based on positioning signal measurements.

FIG. 5 is a diagram 500 illustrating a network entity 508 that may be configured to coordinate a wireless device 502 and a wireless device 506 to perform positioning with a wireless device 504. The location of the wireless device 502 and the wireless device 506 may be known to at least one device, such as the wireless device 502, the wireless device 504, the wireless device 506, and/or the network entity 508. The wireless device 502 may be a base station, a gNB, or a TRP. The wireless device 506 may be a base station, a gNB, or a TRP. The wireless device 504 may be a UE or a PRU. A PRU may be a UE with a known location, for example the PRU may be affixed in place or may be placed in a known location for a period of time, or the PRU may have a set of sensors (e.g., high-accuracy GNSS sensor) that may be used to accurately calculate the location of the PRU. The network entity 508 may be connected to the wireless device 502 and the wireless device 506 via a physical link, for example a backhaul link or a midhaul link, or via a wireless link, such as an air interface (Uu) link. The network entity 508 may be part of a core network, such as an LMF or a set of location servers. The network entity 508 may configure positioning occasions between the wireless device 502, the wireless device 504, and the wireless device 506.

To perform positioning, the network entity 508 may configure one or more of the wireless devices to transmit positioning signals at one another. For example, the wireless device 504 may transmit the set of positioning signals 512 at the wireless device 502. The set of positioning signals 512 may be a set of SRSs, SSBs, or CSI-RSs. The wireless device 502 may measure the set of positioning signals 512. The wireless device 502 may transmit the set of positioning signals 516 at the wireless device 504. The set of positioning signals 516 may be a set of PRSs, SSBs, or CSI-RSs. The wireless device 504 may measure the set of positioning signals 516. The wireless device 504 may transmit a set of positioning signals 514 at the wireless device 506. The set of positioning signals 514 may be a set of SRSs, SSBs, or CSI-RSs. The wireless device 506 may measure the set of positioning signals 514. The wireless device 506 may transmit a set of positioning signals 518 at the wireless device 504. The set of positioning signals 518 may be a set of PRSs, SSBs, or CSI-RSs. The wireless device 504 may measure the set of positioning signals 518. One or more of the wireless devices may measure the received positioning signals to calculate a positioning measurement that may be used to calculate a position/location of the wireless device 504, or may be used to calculate a position/location of the wireless device 504. For example, if the location of the wireless device 502 and the location of the wireless device 506 are known, the location of the wireless device 504 may be calculated based on a RTT between the wireless device 502 and the wireless device 504, and a RTT between the wireless device 504 and the wireless device 506. In another example, the wireless device 504 may calculate an angle of arrival (AoA) or an angle of departure (AoD) of the set of positioning signals 516, and may calculate an AoA or an AoD of the set of positioning signals 518. The calculated AoAs and/or AoDs may be used to calculate a position of the wireless device 504 if the location of the wireless device 502 and the location of the wireless device 506 are also known. Other measurements, such as RTOA, line-of-sight (LOS) identification (identifying whether there is a direct line-of-sight path between wireless devices), or multi-cell round trip time (multi-RTT) calculations may be performed to calculate the position of the wireless device 504, or to calculate a measurement that may be used to calculate the position of the wireless device 504.

In some aspects, a positioning model may be used to calculate one or more positioning metrics based on the measurements. For example, based on the measurements of the set of positioning signals 512 and/or the set of positioning signals 514 transmitted by the wireless device 504, a position/location of the wireless device 504 may be calculated or estimated, or an intermediate measurement that may be used to calculate the position/location of the wireless device 504 may be calculated or estimated. A positioning model may be trained using artificial intelligence (AI)/machine learning (ML) (AI/ML or AIML), based on a set of inputs (e.g., measurements of positioning signals, assistance information associated with the positioning signals) and a set of labels. A positioning signal may include any reference signal transmitted from a wireless device, such as a PRS, a SRS, an SSB, or a CSI-RS. An RS transmitted from a UE, such as a PRU, may be referred to as an uplink positioning signal, or an UL positioning signal. An RS transmitted from a base station, or TRP, may be referred to as a downlink positioning signal, or a DL positioning signal. A measurement may be a channel impulse response (CIR), a channel frequency response (CFR), or other measurement used for performing positioning on a target wireless device. A label may be a calculated, derived, or given (i.e., known) expected result associated with a set of inputs, such as a position/location of a wireless device 504 or an intermediate measurement (e.g., a timing measurement, an angle measurement, a LOS identification) that may be used to calculate the position/location of the wireless device 504. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs. The positioning model may operate on any wireless device based on a set of inputs. For example, the wireless device 502 may have a positioning model configured to accept a set of positioning measurements and generate an estimate of a position/location of the wireless device 504. In another example, the wireless device 502 may have a positioning model configured to accept a set of positioning measurements and generate an intermediate measurement (e.g., a timing measurement, an angle measurement, a LOS identification) that may be used (by the wireless device 502, or another entity, such as the network entity 508, the wireless device 504, or the wireless device 506) to calculate the position/location of the wireless device 504. In another example, the network entity 508 may have a positioning model configured to accept a set of positioning measurements and generate an estimate of a position/location of the wireless device 504, or generate an intermediate measurement that may be used to calculate the position/location of the wireless device 504. In another example, the wireless device 504 may have a positioning model configured to accept a set of positioning measurements and generate an estimate of a position/location of the wireless device 504, or generate an intermediate measurement that may be used to calculate the position/location of the wireless device 504. In some aspects, the positioning measurements may be aggregated by the entity with the positioning model, for example the network entity 508 may aggregate measurements of the set of positioning signals 512 from the wireless device 502, measurements of the set of positioning signals 514 the wireless device 506 to use as inputs to a positioning model, measurements of the set of positioning signals 516 from the wireless device 504, and/or measurements of the set of positioning signals 518 from the wireless device 504.

A positioning model may be trained on a wireless device that performs positioning, such as the wireless device 502, the wireless device 504, the wireless device 506 and/or the network entity 508, or may be trained on an offline device, such as an over-the-top (OTT) server. The inputs to the positioning model may include measurements of positioning signals, such as measurements of SRS, PRS, SSB, and/or CSI-RS. The inputs to the measurements may include assistance information associated with the measured positioning signals, such as BWP of a positioning signal resource, number of TRPs, beam information, positioning signal configuration). The labels/outputs for the positioning model may include a location, or an intermediate measurement.

In some aspects, a positioning model may be configured to use measurements of positioning signals transmitted from a wireless device to calculate a position of the wireless device 504, or to calculate an intermediate measurement that may be used to calculate the position of the wireless device 504. The positioning model may be trained via a training entity, and may be used at the wireless device 502, at the wireless device 504, at the wireless device 506, or at the network entity 508. For example, a positioning model at the wireless device 504 may be configured to calculate the location of the wireless device 504 based on measurements of the set of positioning signals 516 and/or the set of positioning signals 518. In another example, the wireless device 502 may transmit a set of intermediate measurements to the network entity 508 so that the network entity 508 may calculate the location of the wireless device 504 based on the set of intermediate measurements. In another example, the wireless device 504 may transmit measurements of the set of positioning signals 516 and/or the set of positioning signals 518 to the network entity 508. The positioning model may be at the network entity 508. The positioning model at the network entity 508 may calculate the location of the wireless device 504 based on the transmitted measurements of the set of positioning signals 516 and/or the set of positioning signals 518 from the wireless device 504, the transmitted measurements of the set of positioning signals 512 from the wireless device 502, and/or the transmitted measurements of the set of positioning signals 514 from the wireless device 506. In other words, any of the wireless device 502, the wireless device 504, and/or the wireless device 506 may assist the network entity 508 in performing positioning using a trained positioning model.

In some aspects, a positioning model may be site-specific. For example, a first positioning model may be trained in a location, or a set of locations, associated with a first site having a first set of borders, and a second positioning model may be trained in a location, or a set of locations, associated with a second site having a second set of borders. A wireless device may be configured to use one of a plurality of site-specific positioning models. For example, the wireless device may select a site-specific positioning model based on its location, or may select a site-specific positioning model based on an indicator, for example a signal transmitted from the network entity 508 that indicates that a particular site-specific positioning model from a plurality of site-specific positioning models be selected.

Measurements of positioning signals may be performed by measuring channels between a target device (e.g., the wireless device 504) and a set of network nodes (e.g., the wireless device 502 and the wireless device 506). The wireless device 504 may transmit a positioning signal, such as an SRS, an SSB, or a CSI-RS. The wireless device 502 and/or the wireless device 506 may measure the positioning signal for data collection purposes to train a positioning model. The wireless device 504 and/or the wireless device 506 may transmit a positioning signal, such as a PRS, an SSB, or a CSI-RS. The wireless device 504 may measure the positioning signal for data collection purposes to train the positioning model. The wireless device 502, the wireless device 504, and/or the wireless device 506 may measure a positioning signal resource in a plurality of ways, for example the measurement may be a channel impulse response (CIR), a channel frequency response (CFR), a power delay profile (PDP), a set of reflection paths, a reception-transmission (Rx-Tx) time difference, a received signal strength indicator (RSSI), a reference signal received power (RSRP), a reference signal received power path (RSRPP), a reference signal received quality (RSRQ), a time of arrival (ToA), a reference signal time difference (RSTD), or an angle of departure (AoD).

While diagram 500 illustrates two positioning neighbor wireless devices, wireless device 502 and wireless device 506, configured to perform positioning with one positioning target wireless device, wireless device 504, to calculate a position/location of the wireless device 504, any number of positioning neighbor wireless devices may be configured to perform positioning with any number of positioning target wireless devices. For example, four positioning neighbor wireless devices may be configured to calculate the position/location of two positioning target wireless devices, three positioning neighbor wireless devices may be configured to calculate the position/location of one positioning target wireless device, or two positioning neighbor wireless devices may be configured to calculate the position/location of one positioning target wireless device.

In some aspects, a wireless device, such as the wireless device 504, may have one or more location-based services that are dependent on a location, or are dependent on location information, associated with the wireless device. A location-based service may be a service of a wireless device that uses one or more variables that change if the location of the wireless device changes by more than a minimum threshold amount. Such location-based services may include, for example, a beam management service, a CSI feedback service, an activation/deactivation/selection of a site-specific location-based service model, a beam prediction service, or a TRP handover service. A beam management service may include a service that calculates or performs inter-cell beam management for a wireless device. The beam management service may include inter-cell frequency planning. A CSI feedback service may include a service that estimates a channel of the wireless device based on CSI. A site-specific location-based service model may be an AI/ML model used to calculate a location-based attribute of the wireless device. Such models may include beam prediction models or CSI feedback. A TRP handover service may include a service that performs a handover operation from one cell to another cell for the wireless device.

Since a KPI of a location-based service may be affected by an erroneous estimate of the location and/or position of the wireless device, and a positioning method (e.g., use of a site-specific positioning model, use of a site-specific positioning algorithm) may also be affected by an erroneous estimate of the location and/or position of the wireless device, monitoring the KPI of one or more location-based services of the wireless device may help to indicate a possible error with a positioning method of the same wireless device. For example, if a signal received by the wireless device 504 for a location-based service suffers from an extreme dropping in throughput levels, high NACK rates, a beam failure, and/or a cell dropping scenario, a positioning method used by the wireless device 504 may also suffer from similar errors. The wireless device 504 may monitor a set of KPIs for a set of location-based services. The set of KPIs may include, for example, throughput, NACK rates, or rates of beam failure. In some aspects, the wireless device 504 may be configured to report to the network entity 508 of an indicator of a KPI of a location-based service (e.g., a flag indicator that indicates whether or not the location-based service is failing, a KPI value of the location-based service so that the network entity 508 may determine whether or not the location-based service is failing). In response, the network entity 508 may determine whether a positioning method of the wireless device 504 should change based on the indicator of the KPI. The network entity 508 may transmit an indicator to the wireless device 504 to activate, deactivate, or otherwise change the positioning method of the wireless device 504 to compensate for the failure. For example, in response to receiving the indicator, the wireless device 504 may use a positioning model that calculates a location of the wireless device 504 based on a different set of measurements (e.g., AoA and RTT instead of RSRP).

In some aspects, the network entity 508 may configure the wireless device 504 to monitor a set of KPIs for a set of location-based services of the wireless device 504. The network entity 508 may transmit a configuration to the wireless device 504. The wireless device 504 may receive the configuration from the network entity 508. The configuration may indicate which location-based services (e.g., location-dependent beam management, location-dependent activation for a CSI feedback positioning model, location-based beam prediction) the wireless device 504 should monitor. The configuration may indicate which KPIs (e.g., throughput, NACK rates, rate of beam failure) the wireless device 504 should monitor and/or report. The configuration may indicate how the wireless device 504 reports the set of KPIs. For example, the configuration may indicate whether the wireless device 504 measures a set of KPI based on an event (e.g., when the throughput drops below a threshold, when a NACK rate exceeds a threshold). The configuration may indicate that the wireless device 504 measures a set of KPI periodically, or based on a triggering signal (e.g., a signal from the network entity 508). The configuration may indicate whether the wireless device 504 reports each monitored KPI individually, reports a set of KPI in a bulk report, or statistics of a KPI (e.g., mean of KPI value, median of KPI value, max/min KPI values). The network entity 508 may transmit the configuration in a plurality of ways, for example as part of an LPP assistance data exchange, as part of an LPP broadcast message, as part of an LPP dedicated procedure for monitoring location-based services, in response to a request from the wireless device 504.

The wireless device 504 may transmit an indicator of its capability to the network entity 508. The capability may include the ability for the wireless device 504 to monitor and report a set of KPIs for a set of location-based services of the wireless device 504. The capability may include identifiers of location-based services that the wireless device 504 is capable of monitoring. The capability may include identifiers of KPIs that the wireless device 504 is capable of monitoring. The capability may include identifiers of conditions that may trigger measurements of the set of KPI by the wireless device 504. The capability may include identifiers of reporting options that the wireless device 504 may use to generate a report, and/or transmit a report. The wireless device 504 may transmit the indicator of its capability via a plurality of ways, for example via an LPP capability exchange procedure or in response to a request from the network entity 508.

Figure 6:
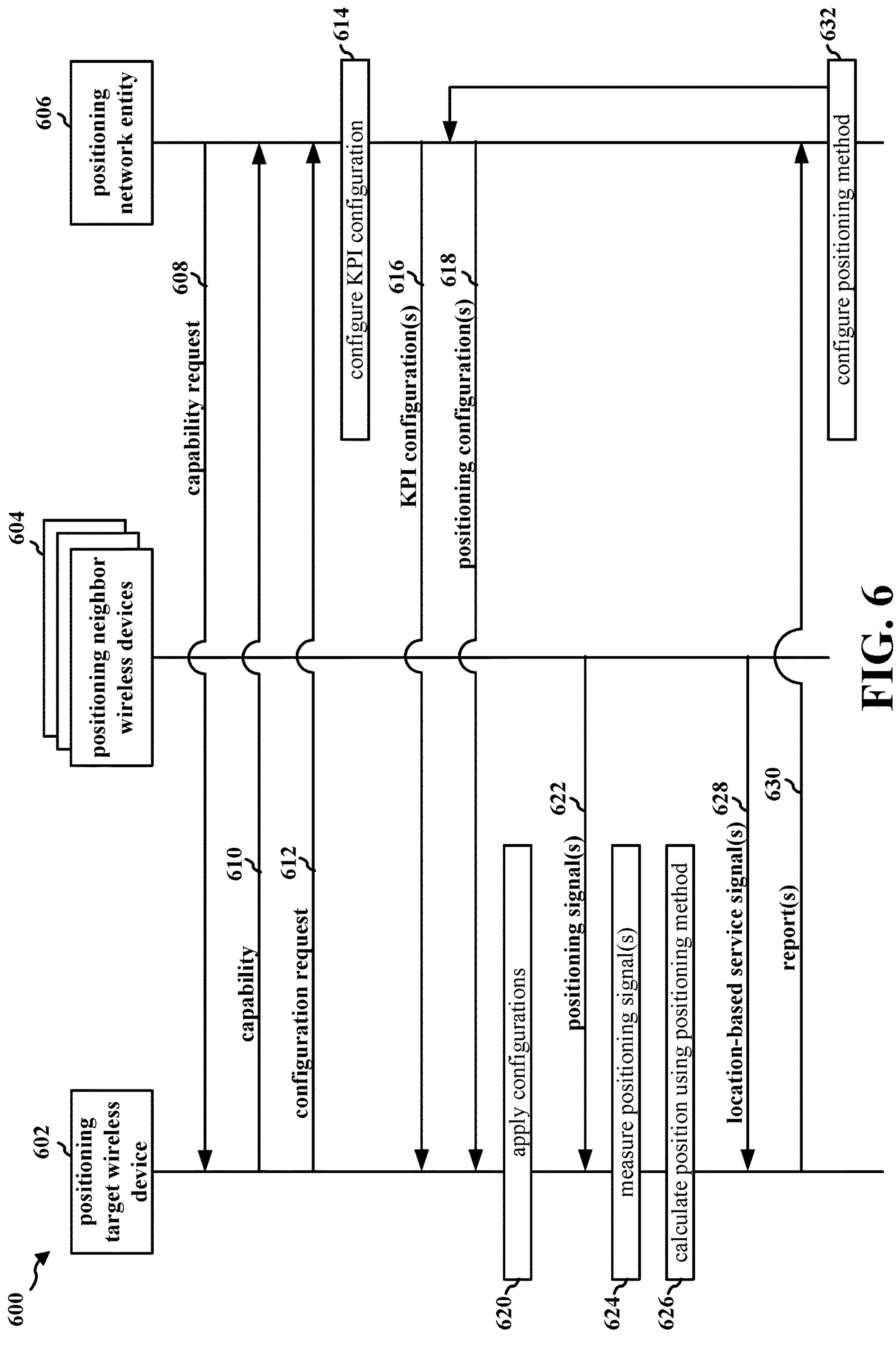
FIG. 6 is a communications flow diagram illustrating an example of positioning based on dynamic positioning signal measurements and/or reporting.

FIG. 6 is a connection flow diagram 600 illustrating an example of communications between a positioning target wireless device 602, a set of positioning neighbor wireless devices 604, and a positioning network entity 606. The positioning target wireless device 602 may be a UE. The set of positioning neighbor wireless devices 604 may include a set of base stations and/or a set of TRPs configured to transmit positioning signals at the positioning target wireless device 602. The positioning network entity 606 may include an LMF, or may include one or more location servers. The positioning network entity 606 may be configured to configure positioning occasions between the positioning target wireless device 602 and the set of positioning neighbor wireless devices 604. The positioning network entity 606 may be configured to configure KPI configuration settings for the positioning target wireless device 602 to measure and report KPI associated with one or more location based services of the positioning target wireless device 602. The positioning target wireless device 602 may be configured with a plurality of positioning methods, and/or may be configured with a positioning method with a plurality of settings, which may be changed based on one or more KPI associated with one or more location based services of the positioning target wireless device 602.

In some aspects, the positioning network entity 606 may transmit a capability request 608 to the positioning target wireless device 602. The positioning target wireless device 602 may receive the capability request 608 from the positioning network entity 606. In some aspects, the positioning network entity 606 and the positioning target wireless device 602 may conduct a long-term evolution (LTE) positioning protocol (LPP) capability exchange procedure that includes the capability request 608. In other words, the positioning network entity 606 may transmit an LPP message (e.g., as part of an LPP (LPP) protocol) that includes the capability request 608. The capability request 608 may include an indicator for the positioning target wireless device 602 to indicate its capability to measure and report one or more KPI.

In some aspects, the positioning target wireless device 602 may transmit a capability 610 to the positioning network entity 606. The positioning network entity 606 may receive the capability 610 from the positioning target wireless device 602. The positioning target wireless device 602 may transmit the capability 610 in response to receiving the capability request 608. In some aspects, the positioning target wireless device 602 may transmit the capability 610 in response to some other stimulus, for example in response to a schedule of the positioning target wireless device 602 to periodically broadcast its capability, or in response to determining that one or more KPI associated with a location-based service of the positioning target wireless device 602 is within a failure threshold range. The capability 610 may include one or more indicators of the capability of the positioning target wireless device 602 to monitor and report KPIs of one or more location-based services of the positioning target wireless device 602. In one aspect, the capability 610 may include a list of the supported location-based services that the positioning target wireless device 602 may monitor. For example, the capability 610 may include a list of identifiers of location-based services, or may include a bitmap of flags set that correspond with location-based services that the positioning target wireless device 602 is capable of monitoring. In one aspect, the capability 610 may include a list of the supported KPIs that the positioning target wireless device 602 may monitor. The list of the supported KPIs may include, for example, an indicator of a perceived throughput associated with a set of location-based service signals (e.g., an RSRP or an indication of a beam failure), an indicator of a beam failure associated with a set of location-based service signals (e.g., an RSRP), or an indicator of a negative acknowledgement (NACK) rate associated with a set of location-based service signals. A location-based service signal may include PDSCH channel transmissions, commands for beam-switching, or switched beams (i.e., beam communication switched from one cell to another cell). In some aspects, the list of the supported KPIs may include a set of supported conditions associated with monitoring the KPI, for example a set of frequencies that the positioning target wireless device 602 is capable of monitoring, or a minimum gap length for monitoring the set of location-based service signals. In one aspect, the capability 610 may include a list of the supported reporting options, or reporting formats, by the positioning target wireless device 602. For example, the positioning target wireless device 602 may be configured to indicate in a report a flag that indicates whether a location-based service is failing based on monitored signals. In another example, the positioning target wireless device 602 may be configured to indicate in a report a KPI value (e.g., a NACK rate) that corresponds with a location-based service. In some aspects, the positioning network entity 606 and the positioning target wireless device 602 may conduct an LPP capability exchange procedure that includes the capability 610. In other words, the positioning target wireless device 602 may transmit an LPP message (e.g., as part of an LPP protocol) that includes the capability 610.

In some aspects, the positioning target wireless device 602 may transmit a configuration request 612 to the positioning network entity 606. The positioning network entity

606 may receive the configuration request 612 from the positioning target wireless device 602. In some aspects, the positioning network entity 606 and the positioning target wireless device 602 may conduct an LPP assistance data exchange that includes the configuration request 612. In other words, the positioning target wireless device 602 may transmit an LPP message (e.g., as part of an LPP protocol) that includes the configuration request 612. The configuration request 612 may include an indicator for the positioning network entity 606 to configure aspects of the positioning target wireless device 602's monitoring and/or reporting of KPIs associated with one or more location-based services of the positioning target wireless device 602.

At 614, the positioning network entity 606 may configure a KPI configuration for the positioning target wireless device 602. The positioning network entity 606 may configure the KPI configuration based on the capability 610 received from the positioning target wireless device 602. The positioning network entity 606 may also, or alternatively, configure the KPI configuration based on other information, for example site information associated with the positioning target wireless device 602 or neighboring cells of the positioning target wireless device 602.

In some aspects, the positioning network entity 606 may transmit a set of KPI configurations 616 to the positioning target wireless device 602. The positioning target wireless device 602 may receive the set of KPI configurations 616 from the positioning network entity 606. The positioning network entity 606 may transmit the set of KPI configurations 616 in response to receiving the configuration request 612. In some aspects, the positioning network entity 606 may transmit the set of KPI configurations 616 in response to some other stimulus, for example in response to a schedule of the positioning network entity 606 to periodically broadcast a KPI configuration, or in response to determining that the positioning target wireless device 602 has a high likelihood of being within a site, or of approaching a site, that is associated with a higher failure rate for location-dependent services. In some aspects, the positioning network entity 606 and the positioning target wireless device 602 may conduct an LPP assistance data exchange procedure that includes the set of KPI configurations 616. In other words, the positioning network entity 606 may transmit an LPP message (e.g., as part of an LPPa protocol) that includes the set of KPI configurations 616. In some aspects, the positioning network entity 606 may broadcast an LPP broadcast message including the set of KPI configurations 616. For example, the positioning network entity 606 may periodically broadcast the set of KPI configurations 616 according to a schedule, or may aperiodically broadcast the set of KPI configurations 616 in response to a trigger stimulus, for example determining that a set of wireless devices are approaching a site with a higher likelihood of failure for location-based services. In some aspects, the positioning network entity 606 may transmit the set of KPI configurations 616 as part of an LPP dedicated procedure for positioning monitoring. In some aspects, the positioning network entity 606 may transmit the set of KPI configurations 616 as part of an LPP assistance data exchange. In some aspects, the positioning network entity 606 may transmit the set of KPI configurations 616 in response to receiving the configuration request 612 from the positioning target wireless device 602.

The set of KPI configurations 616 may include a configuration, for the positioning target wireless device 602, to enable monitoring based on a set of location-based services. In some aspects, the set of KPI configurations 616 may include an indicator of the set of location-based services for the positioning target wireless device 602 to monitor and report. The set of location-based services may include, for example, a beam management service, a CSI feedback service, an activation/deactivation/change of a site-specific location-based service model, a beam prediction service, a TRP handover service. The set of KPI configurations 616 may include a set of location-based service identifiers each associated with a discrete set of location-based services, or may include a bitmap of flags, where flags are set if they are associated with a location-based service for the positioning target wireless device 602 to monitor. In some aspects, the set of KPI configurations 616 may include a set of aspects for monitoring. The set of aspects may include a set of KPIs to monitor. The KPIs may include, for example, a perceived throughput associated with a set of location-based service signals, a beam failure, or beam failure rate, associated with a set of location-based service signals, or a NACK rate associated with a set of location-based service signals. The set of aspects may include a set of conditions associated with monitoring the set of KPIs. For example, the set of conditions may be event-based (e.g., record a set of KPIs if a monitored throughput is equal to or below a threshold level, record a set of KPIs if a monitored NACK rate is greater than or equal to a threshold level). In another example, the set of conditions may be trigger-based (e.g., a network activity of a set of location-based service signals transmitted to the positioning target wireless device 602). In some aspects, the set of KPI configurations 616 may include a set of aspects of reporting for the positioning target wireless device 602. The set of aspects of reporting may include a periodicity for the positioning target wireless device 602 to transmit a report, or may include a trigger that, upon detection, the positioning target wireless device 602 transmits the set of KPIs. The set of aspects of reporting may include a quantity associated with the report, for example whether the report transmits KPIs individually or in bulk as a plurality of KPIs, or transmits statistics of a set of KPIs (e.g., a rate, a median, a mean) of the monitored KPIs. The set of aspects of reporting may include a reporting format, for example whether the report includes a flag that a location-based service is failing (e.g., the KPI is within a failure threshold range), or whether the report includes an indicator of the actual measured KPI corresponding with the location-based service. A failure threshold range may be open-ended, for example $x>y$, $x \geq y$, $x<y$, $x \leq y$, or may be bounded, for example $a<x<b$, $a \leq x<b$, $a<x \leq b$, $a \leq x \leq b$.

The positioning network entity 606 may transmit a set of positioning configurations 618 to the positioning target wireless device 602. The positioning target wireless device 602 may receive the set of positioning configurations 618 from the positioning network entity 606. The set of positioning configurations 618 may indicate to the positioning target wireless device 602 a schedule for the set of positioning signals 622 to be received by the positioning target wireless device 602. The set of positioning configurations 618 may indicate one or more positioning methods for the positioning target wireless device 602 to use for performing positioning on the set of positioning signals 622. The positioning methods may include, for example, an indicator of a set of positioning models for the positioning target wireless device 602.

At 620, the positioning target wireless device 602 may apply the set of KPI configurations 616 and the set of positioning configurations 618. The set of positioning neighbor wireless devices 604 may transmit the set of positioning signals 622 to the positioning target wireless device 602. In some aspects, the positioning network entity 606 may configure the transmission of the set of positioning signals 622 by the set of positioning neighbor wireless devices 604.

At 624, the positioning target wireless device 602 may measure the set of positioning signals 622 based on the set of positioning configurations 618. At 626, the positioning target wireless device 602 may calculate a location of the positioning target wireless device 602 based on the set of positioning configurations 618, for example by applying a positioning model indicated by the set of positioning configurations 618. In some aspects, the positioning target wireless device 602 may transmit a set of reports indicating the calculated location, for example to one of the set of positioning neighbor wireless devices 604 or to the positioning network entity 606.

At least one of the set of positioning neighbor wireless devices 604 may transmit a set of location-based service signals 628 to the positioning target wireless device 602. The positioning target wireless device 602 may receive the set of location-based service signals 628 from at least one of the set of positioning neighbor wireless devices 604. The positioning target wireless device 602 may use the set of location-based service signals 628 to perform a location-based service, for example a beam management service, a CSI feedback service, a beam prediction service, a TRP handover service, and/or using a site-specific location-based service model (e.g., an AI/ML model). The positioning target wireless device 602 may monitor a set of KPIs associated with a set of location-based services based on the set of KPI configurations 616. The positioning target wireless device 602 may transmit a set of reports 630 to the positioning network entity 606 based on the monitored set of KPIs. The positioning network entity 606 may receive the set of reports 630. The set of reports 630 may include an indicator of a set of KPIs of a set of location-based services for the positioning target wireless device 602 based on the set of location-based service signals 628. For example, the set of reports 630 may include an indicator of whether a location-based service is failing, or may include a KPI for a location-based service of the positioning target wireless device 602.

At 632, the positioning network entity 606 may configure a positioning method for the positioning target wireless device 602 based on the set of reports 630. For example, the positioning network entity 606 may indicate for the positioning target wireless device 602 to activate, deactivate, and/or change a positioning model based on the set of reports 630. The positioning network entity 606 may then transmit the indication of the new configuration as the set of positioning configurations 618 to the positioning target wireless device 602.

Figure 7:
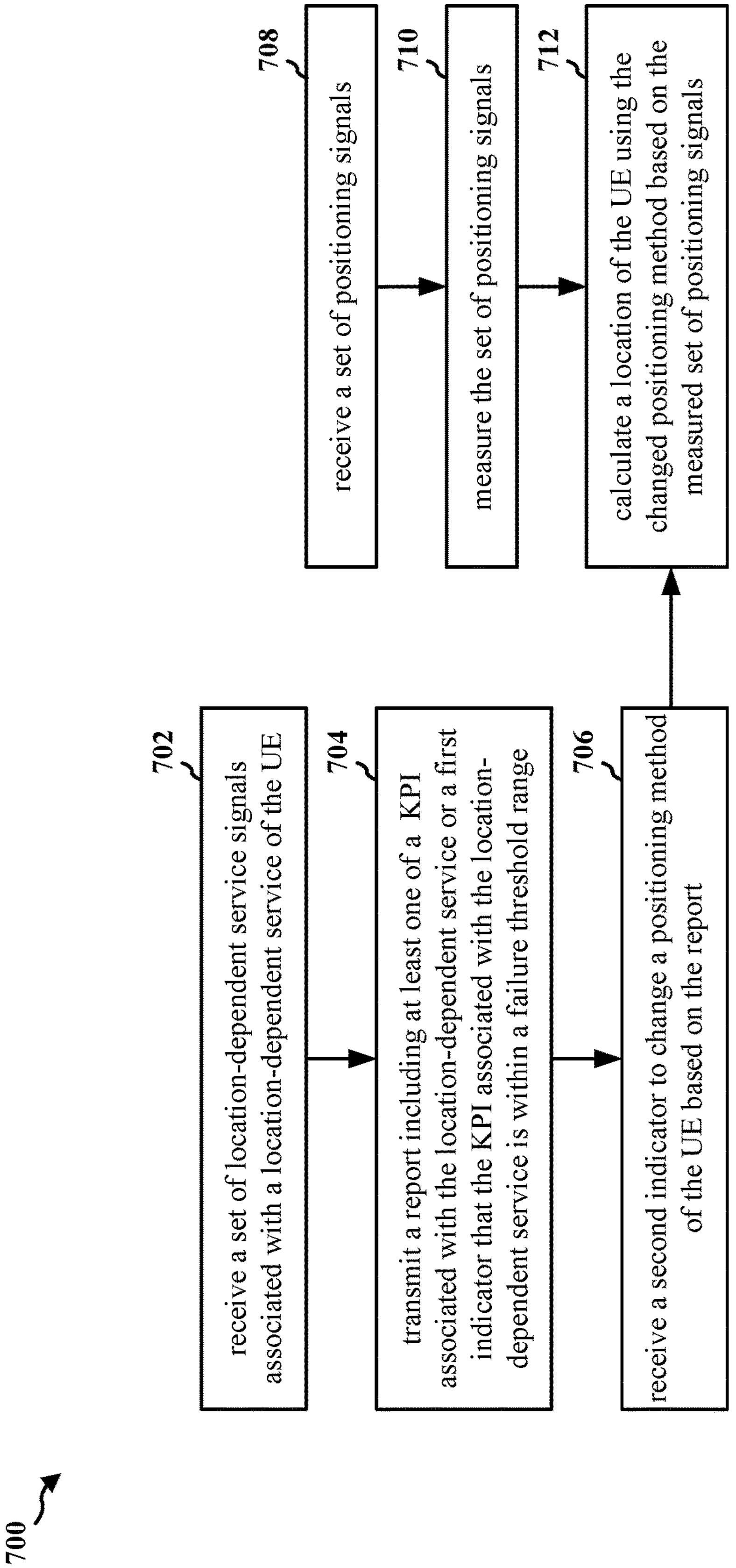
FIG. 7 is a flowchart of a method of wireless communication.

FIG. 7 is a flowchart 700 of a method of wireless communication. The method may be performed by a UE (e.g., the UE 104, the UE 350; the wireless device 404, the wireless device 504; the positioning target wireless device 602; the apparatus 1104). At 702, the UE may receive a set of location-dependent service signals associated with a location-dependent service of the UE. For example, 702 may be performed by the positioning target wireless device 602, which may receive the set of location-based service signals 628 associated with a location-dependent service of the positioning target wireless device 602. In some aspects, the positioning target wireless device 602 may receive location-based service signals from other devices not shown in the connection flow diagram 600, for example other base stations or other wireless devices. Moreover, 702 may be performed by the component 198 in FIG. 1, 3, or 11.

At 704, the UE may transmit a report including at least one of a KPI associated with the location-dependent service or a first indicator that the KPI associated with the location-dependent service is within a failure threshold range. For example, 704 may be performed by the positioning target wireless device 602, which may transmit the set of reports 630 to the positioning network entity 606. The set of reports 630 may include an indicator of at least one of a KPI associated with the location-dependent service of the positioning target wireless device 602 or an indicator that the KPI associated with the location-dependent service of the positioning target wireless device 602 is within a failure threshold range. Moreover, 704 may be performed by the component 198 in FIG. 1, 3, or 11.

At 706, the UE may receive a second indicator to change a positioning method of the UE based on the report. For example, 706 may be performed by the positioning target wireless device 602, which may receive the set of positioning configurations 618 from the positioning network entity 606. The set of positioning configurations 618 may include an indicator for the positioning target wireless device 602 to change a positioning method of the positioning target wireless device 602 based on the set of reports 630. Moreover, 706 may be performed by the component 198 in FIG. 1, 3, or 11.

At 708, the UE may receive a set of positioning signals. For example, 708 may be performed by the positioning target wireless device 602, which may receive the signals 622 from the set of positioning neighbor wireless devices 604. Moreover, 708 may be performed by the component 198 in FIG. 1, 3, or 11.

At 710, the UE may measure the set of positioning signals. For example, 710 may be performed by the positioning target wireless device 602, which may, at 624, measure the set of positioning signals 622. Moreover, 710 may be performed by the component 198 in FIG. 1, 3, or 11.

At 712, the UE may calculate a location of the UE using the changed positioning method based on the measured set of positioning signals. For example, 712 may be performed by the positioning target wireless device 602, which may, at 626, calculate a location of the positioning target wireless device 602 using the changed positioning method based on the measurements collected at 624. Moreover, 712 may be performed by the component 198 in FIG. 1, 3, or 11.

Figure 8:
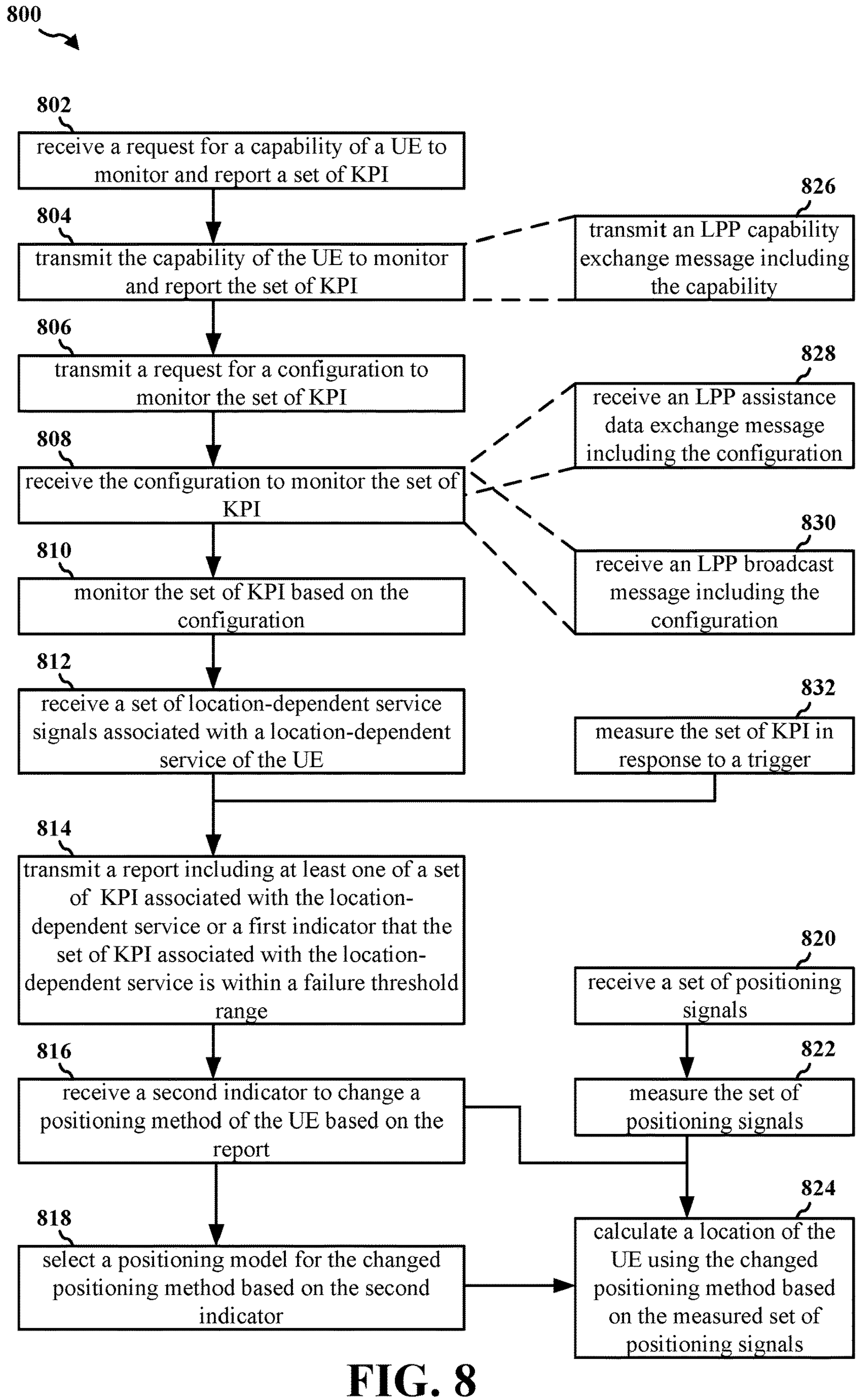
FIG. 8 is a flowchart of a method of wireless communication.

FIG. 8 is a flowchart 800 of a method of wireless communication. The method may be performed by a UE (e.g., the UE 104, the UE 350; the wireless device 404, the wireless device 504; the positioning target wireless device 602; the apparatus 1104).

At 802, the UE may receive a request for a capability of a UE to monitor and report a set of KPI. For example, 802 may be performed by the positioning target wireless device 602, which may receive the capability request 608 from the positioning network entity 606. The capability request 608 may include a request for a capability of the positioning target wireless device 602 to monitor and report a set of KPI. Moreover, 802 may be performed by the component 198 in FIG. 1, 3, or 11.

At 804, the UE may transmit the capability of the UE to monitor and report the set of KPI. The capability may include (a) a third indicator of a set of location-based services associated with the set of KPI, (b) a fourth indicator of the set of KPI, and/or (c) a fifth indicator of a set of reporting formats associated with the set of KPI. For example, 804 may be performed by the positioning target wireless device 602, which may transmit the capability 610 of the positioning target wireless device 602 to monitor and report the set of KPI to the positioning network entity 606. The capability 610 may include (a) an indicator of a set of location-based services that the positioning target wireless device 602 is capable of monitoring KPI for. (b) an indicator of the set of KPI that the positioning target wireless device 602 is capable of monitoring, and/or (c) an indicator of a set of reporting formats that the positioning target wireless device 602 is capable of generating and reporting. Moreover, 804 may be performed by the component 198 in FIG. 1, 3, or 11.

At 806, the UE may transmit a request for a configuration to monitor the set of KPI. For example, 806 may be performed by the positioning target wireless device 602, which may transmit the configuration request 612 to the positioning network entity 606. The configuration request 612 may include an indicator for a configuration to monitor the set of KPI. Moreover, 806 may be performed by the component 198 in FIG. 1, 3, or 11.

At 808, the UE may receive the configuration to monitor the set of KPI. The configuration may include (a) a third indicator of the KPI, (b) a fourth indicator of a trigger associated with a measurement of the KPI, (c) a fifth indicator of a timing associated with the transmission of the report. (d) a sixth indicator of a quantity of measurements associated with the KPI, and/or (e) a seventh indicator of a reporting format associated with the report. For example, 808 may be performed by the positioning target wireless device 602, which may receive the set of KPI configurations 616 from the positioning network entity 606. The set of KPI configurations 616 may include a configuration to monitor the set of KPI. The configuration may include (a) an indicator of the set of KPI for the positioning target wireless device 602 to monitor/report, (b) an indicator of a trigger that the positioning target wireless device 602 will respond to for measuring the set of KPI, (c) an indicator of a timing that the positioning target wireless device 602 will use to transmit the set of reports 630, (d) an indicator of a quantity of measurements to transmit in the set of reports 630, and/or (e) an indicator of a reporting format for the positioning target wireless device 602 to use to generate the set of reports 630. Moreover, 808 may be performed by the component 198 in FIG. 1, 3, or 11.

At 810, the UE may monitor the set of KPI based on the configuration. For example, 810 may be performed by the positioning target wireless device 602, which may monitor the set of KPI based on the set of KPI configurations 616. Moreover, 810 may be performed by the component 198 in FIG. 1, 3, or 11.

At 812, the UE may receive a set of location-dependent service signals associated with a location-dependent service of the UE. The location-based service may include (a) a beam management service. (b) a CSI feedback service, (c) an activation of a site-specific location-based service model, (d) a beam prediction service, and/or (e) a TRP handover service. For example, 812 may be performed by the positioning target wireless device 602, which may receive the set of location-based service signals 628 associated with a location-dependent service of the positioning target wireless device 602. In some aspects, the positioning target wireless device 602 may receive location-based service signals from other devices not shown in the connection flow diagram 600, for example other base stations or other wireless devices. The location-based service may include (a) a beam management service, (b) a CSI feedback service, (c) an activation of a site-specific location-based service model, (d) a beam prediction service, and/or (e) a TRP handover service. Moreover, 812 may be performed by the component 198 in FIG. 1, 3, or 11.

At 814, the UE may transmit a report including a KPI associated with the location-dependent service and/or a first indicator that the KPI associated with the location-dependent service is within a failure threshold range. The KPI associated with the location-based service may include (a) a third indicator of perceived throughput associated with the set of location-based service signals, (b) a fourth indicator of a beam failure associated with the set of location-based service signals, and/or (c) a fifth indicator of a NACK rate associated with the set of location-based service signals. For example, 814 may be performed by the positioning target wireless device 602, which may transmit the set of reports 630 to the positioning network entity 606. The set of reports 630 may include an indicator of a KPI associated with the location-dependent service of the positioning target wireless device 602 and/or an indicator that the KPI associated with the location-dependent service of the positioning target wireless device 602 is within a failure threshold range. The KPI associated with the location-based service may include (a) an indicator of perceived throughput associated with the set of location-based service signals, (b) an indicator of a beam failure associated with the set of location-based service signals, and/or (c) an indicator of a NACK rate associated with the set of location-based service signals. Moreover, 814 may be performed by the component 198 in FIG. 1, 3, or 11.

At 816, the UE may receive a second indicator to change a positioning method of the UE based on the report. For example, 816 may be performed by the positioning target wireless device 602, which may receive the set of positioning configurations 618 from the positioning network entity 606. The set of positioning configurations 618 may include an indicator for the positioning target wireless device 602 to change a positioning method of the positioning target wireless device 602 based on the set of reports 630. Moreover, 816 may be performed by the component 198 in FIG. 1, 3, or 11.

At 818, the UE may select a positioning model for the changed positioning method based on the second indicator. For example, 818 may be performed by the positioning target wireless device 602, which may, at 620, select a positioning model for the changed positioning method based on an indicator of the set of positioning configurations 618. Moreover, 818 may be performed by the component 198 in FIG. 1,3, or 11.

At 820, the UE may receive a set of positioning signals. For example, 820 may be performed by the positioning target wireless device 602, which may receive the signals 622 from the set of positioning neighbor wireless devices 604. Moreover, 820 may be performed by the component 198 in FIG. 1, 3, or 11.

At 822, the UE may measure the set of positioning signals. For example, 822 may be performed by the positioning target wireless device 602, which may, at 624, measure the set of positioning signals 622. Moreover, 822 may be performed by the component 198 in FIG. 1, 3, or 11.

At 824, the UE may calculate a location of the UE using the changed positioning method based on the measured set of positioning signals. For example, 824 may be performed by the positioning target wireless device 602, which may, at 626, calculate a location of the positioning target wireless device 602 using the changed positioning method based on the measurements collected at 624. Moreover, 824 may be performed by the component 198 in FIG. 1, 3, or 11.

At 826, the UE may transmit the capability of the UE to monitor and report the set of KPI by transmitting an LPP capability exchange message including the capability. For example, 826 may be performed by the positioning target wireless device 602, which may transmit an LPP capability exchange message including the capability 610. Moreover, 826 may be performed by the component 198 in FIG. 1, 3, or 11.

At 828, the UE may receive the configuration to monitor the set of KPI by receiving an LPP assistance data exchange message including the configuration. For example, 828 may be performed by the positioning target wireless device 602, which may receive an LPP assistance data exchange message including the set of KPI configurations 616. Moreover, 828 may be performed by the component 198 in FIG. 1,3, or 11.

At 830, the UE may receive the configuration to monitor the set of KPI by receiving an LPP broadcast message including the configuration. For example, 830 may be performed by the positioning target wireless device 602, which may receive an LPP broadcast message including the set of KPI configurations 616. Moreover, 830 may be performed by the component 198 in FIG. 1, 3, or 11.

At 832, the UE may measure the set of KPI in response to a trigger. For example, 832 may be performed by the positioning target wireless device 602, which may, at 624, measure the set of KPI in response to a trigger (e.g., a NACK, a beam failure rate). The set of KPI configurations 616 may indicate the trigger that the positioning target wireless device 602 responds to in order to measure the set of KPI. Moreover, 832 may be performed by the component 198 in FIG. 1, 3, or 11.

Figure 9:
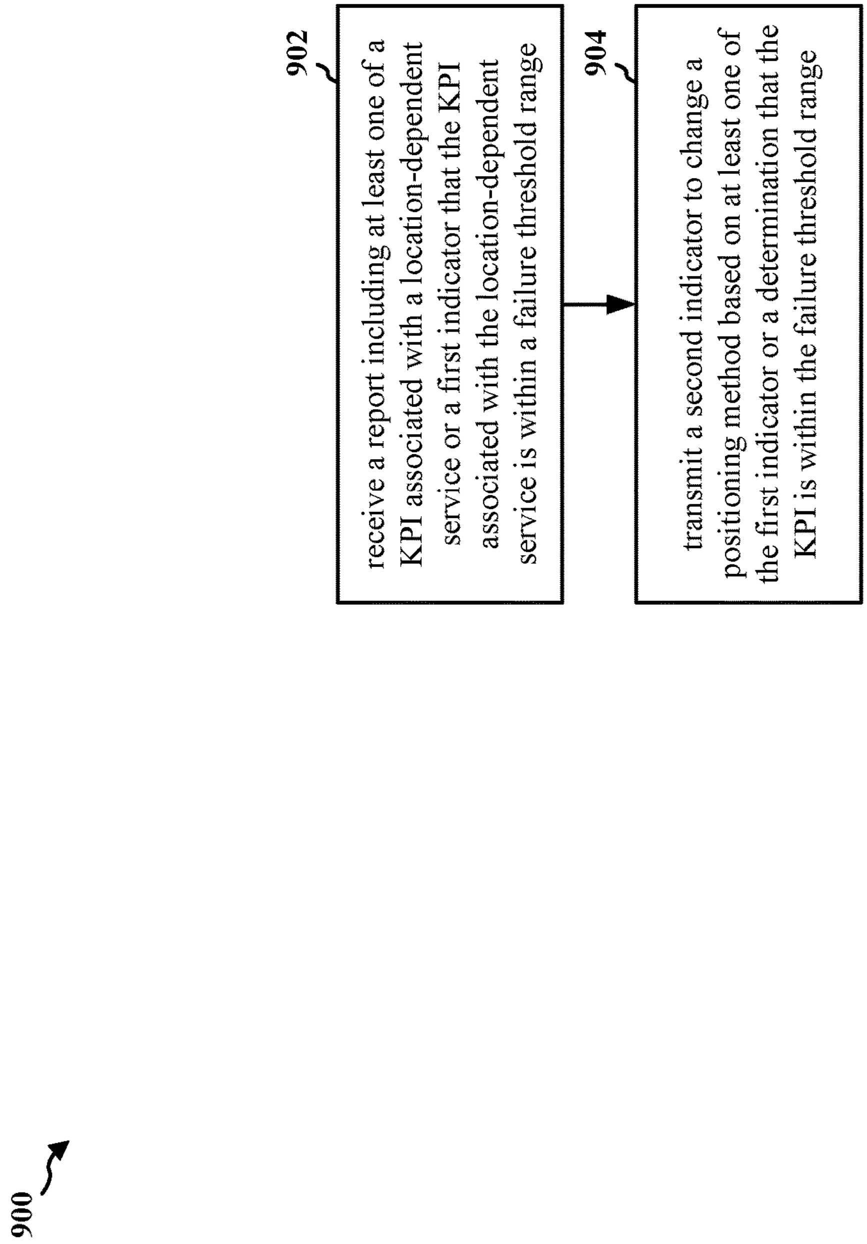
FIG. 9 is a flowchart of a method of wireless communication.

FIG. 9 is a flowchart 900 of a method of wireless communication. The method may be performed by a network entity (e.g., the base station 102, the base station 310; the wireless device 402, the wireless device 406, the wireless device 502, the wireless device 506; the network entity 508; the positioning network entity 606; one of the set of positioning neighbor wireless devices 604; the network entity 1102, the network entity 1202, the network entity 1360). At 902, the network entity may receive a report including a KPI associated with a location-dependent service and/or a first indicator that the KPI associated with the location-dependent service is within a failure threshold range. For example, 902 may be performed by the positioning network entity 606 in FIG. 6, which may receive the set of reports 630 from the positioning target wireless device 602. The set of reports 630 may include a KPI associated with a location-dependent service of the positioning target wireless device 602 and/or an indicator that the KPI associated with the location-dependent service of the positioning target wireless device 602 is within a failure threshold range. Moreover, 902 may be performed by the component 199 in FIG. 1, 3, 12, or 13.

At 904, the network entity may transmit a second indicator to change a positioning method based on the first indicator and/or a determination that the KPI is within the failure threshold range. For example, 904 may be performed by the positioning network entity 606 in FIG. 6, which may transmit the set of positioning configurations 618 to the positioning target wireless device 602. The set of positioning configurations 618 may include an indicator to change a positioning method of the positioning target wireless device 602 based on the indicator of the set of reports 630 and/or a determination that the KPI of the set of reports 630 is within the failure threshold range. Moreover, 904 may be performed by the component 199 in FIG. 1, 3, 12, or 13.

Figure 10:
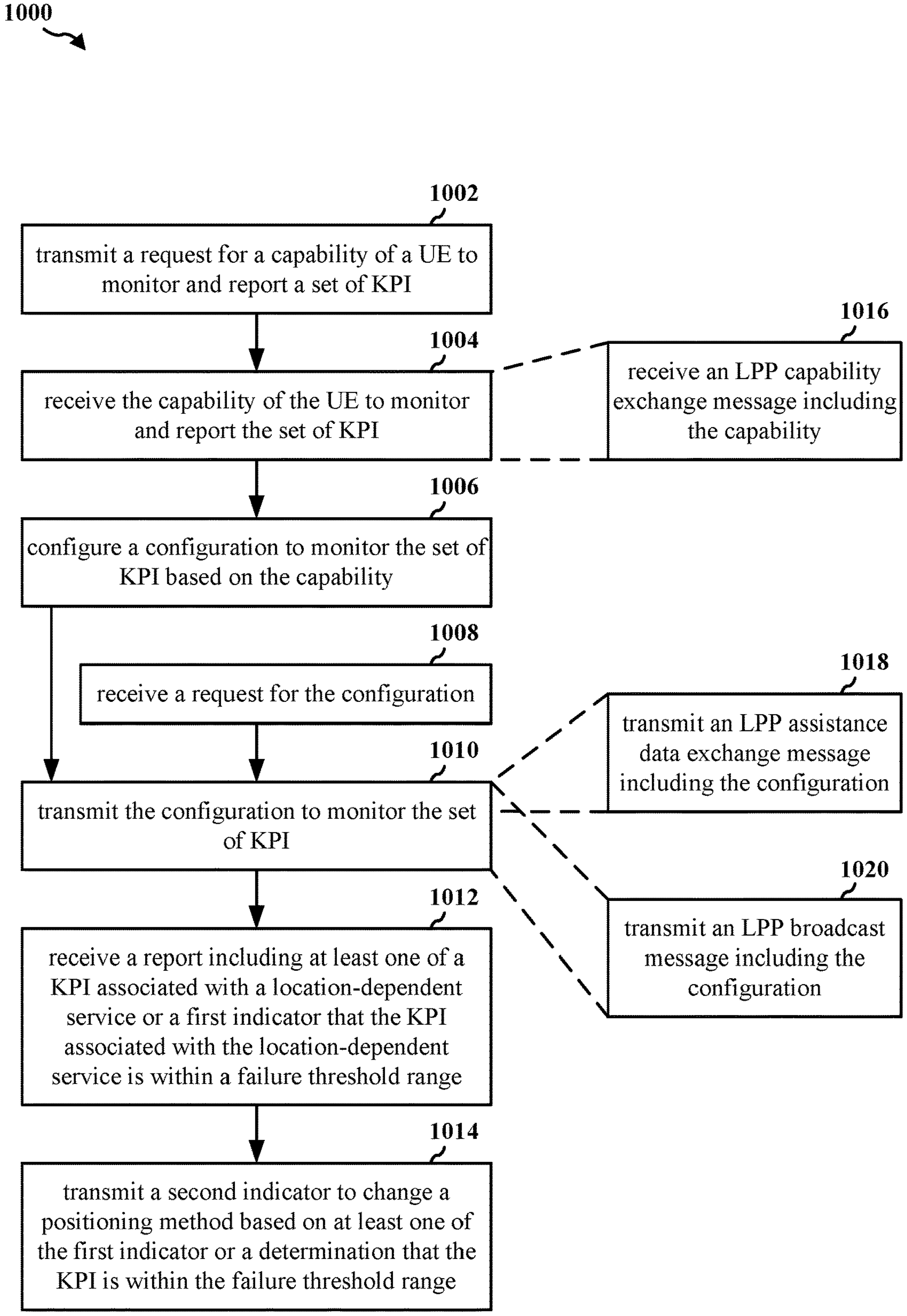
FIG. 10 is a flowchart of a method of wireless communication.

FIG. 10 is a flowchart 1000 of a method of wireless communication. The method may be performed by a network entity (e.g., the base station 102, the base station 310; the wireless device 402, the wireless device 406, the wireless device 502, the wireless device 506; the network entity 508; the positioning network entity 606; one of the set of positioning neighbor wireless devices 604; the network entity 1102, the network entity 1202, the network entity 1360).

At 1002, the network entity may transmit a request for a capability of a UE to monitor and report a set of KPI. For example, 1002 may be performed by the positioning network entity 606 in FIG. 6, which may transmit the capability request 608 to the positioning target wireless device 602. The capability request 608 may include a request for a capability of the positioning target wireless device 602 to monitor and report a set of KPI. Moreover, 1002 may be performed by the component 199 in FIG. 1.3, 12, or 13.

At 1004, the network entity may receive the capability of the UE to monitor and report the set of KPI. The capability may include (a) a third indicator of a set of location-based services associated with the set of KPI, (b) a fourth indicator of the set of KPI, and/or (c) a fifth indicator of a set of reporting formats associated with the set of KPI. For example, 1004 may be performed by the positioning network entity 606 in FIG. 6, which may receive the capability 610 from the positioning target wireless device 602. The capability 610 may include a capability of the positioning target wireless device 602 to monitor and report the set of KPI. The capability 610 may include (a) an indicator of a set of location-based services that the positioning target wireless device 602 is capable of monitoring KPI for, (b) an indicator of the set of KPI that the positioning target wireless device 602 is capable of monitoring, and/or (c) an indicator of a set of reporting formats that the positioning target wireless device 602 is capable of generating and reporting. Moreover, 1004 may be performed by the component 199 in FIG. 1, 3, 12, or 13.

At 1006, the network entity may configure a configuration to monitor the set of KPI based on the capability. For example, 1006 may be performed by the positioning network entity 606 in FIG. 6, which may, at 614, configure a configuration for the positioning target wireless device 602 to monitor the set of KPI based on the capability 610. Moreover, 1006 may be performed by the component 199 in FIG. 1, 3, 12, or 13.

At 1008, the network entity may receive a request for the configuration. For example, 1008 may be performed by the positioning network entity 606 in FIG. 6, which may receive the configuration request 612 from the positioning target wireless device 602. The configuration request 612 may include an indicator for the configuration from the positioning network entity 606. Moreover, 1008 may be performed by the component 199 in FIG. 1, 3, 12, or 13.

At 1010, the network entity may transmit the configuration to monitor the set of KPI. The configuration may include (a) a third indicator of the KPI, (b) a fourth indicator of a trigger associated with a measurement of the KPI, (c) a fifth indicator of a timing associated with the transmission of the report, (d) a sixth indicator of a quantity of measurements associated with the KPI, and/or (e) a seventh indicator of a reporting format associated with the report. For example, 1010 may be performed by the positioning network entity 606 in FIG. 6, which may transmit the set of KPI configurations 616 to the positioning target wireless device 602. The set of KPI configurations 616 may include an indicator for the positioning target wireless device 602 to monitor the set of KPI. The configuration may include (a) an indicator of the set of KPI for the positioning target wireless device 602 to monitor/report, (b) an indicator of a trigger that the positioning target wireless device 602 will respond to for measuring the set of KPI, (c) an indicator of a timing that the positioning target wireless device 602 will use to transmit the set of reports 630. (d) an indicator of a quantity of measurements to transmit in the set of reports 630, and/or (e) an indicator of a reporting format for the positioning target wireless device 602 to use to generate the set of reports 630. Moreover, 1010 may be performed by the component 199 in FIG. 1, 3, 12, or 13.

At 1012, the network entity may receive a report including a KPI associated with a location-dependent service and/or a first indicator that the KPI associated with the location-dependent service is within a failure threshold range. The location-based service may include (a) a beam management service, (b) a CSI feedback service, (c) an activation of a site-specific location-based service model, (d) a beam prediction service, and/or (e) a TRP handover service. The KPI associated with the location-based service may include (a) a third indicator of perceived throughput associated with the set of location-based service signals, (b) a fourth indicator of a beam failure associated with the set of location-based service signals, and/or (c) a fifth indicator of a NACK rate associated with the set of location-based service signals. For example, 1012 may be performed by the positioning network entity 606 in FIG. 6, which may receive the set of reports 630 from the positioning target wireless device 602. The set of reports 630 may include a KPI associated with a location-dependent service of the positioning target wireless device 602 and/or an indicator that the KPI associated with the location-dependent service of the positioning target wireless device 602 is within a failure threshold range. The location-based service may include (a) a beam management service, (b) a CSI feedback service, (c) an activation of a site-specific location-based service model, (d) a beam prediction service, and/or (e) a TRP handover service. The KPI associated with the location-based service may include (a) an indicator of perceived throughput associated with the set of location-based service signals, (b) an indicator of a beam failure associated with the set of location-based service signals, and/or (c) an indicator of a NACK rate associated with the set of location-based service signals. Moreover, 1012 may be performed by the component 199 in FIG. 1, 3, 12, or 13.

At 1014, the network entity may transmit a second indicator to change a positioning method based on the first indicator and/or a determination that the KPI is within the failure threshold range. The second indicator may include an indicator of a positioning model associated with the changed positioning method. For example, 1014 may be performed by the positioning network entity 606 in FIG. 6, which may transmit the set of positioning configurations 618 to the positioning target wireless device 602. The set of positioning configurations 618 may include a second indicator to change a positioning method of the positioning target wireless device 602 based on the indicator of the set of reports 630 and/or a determination that the KPI of the set of reports 630 is within the failure threshold range. The second indicator may indicate a positioning model for the positioning target wireless device 602 to activate, deactivate, and/or change. Moreover, 1014 may be performed by the component 199 in FIG. 1, 3, 12, or 13.

At 1016, the network entity may receive the capability of the UE to monitor and report the set of KPI by receiving an LPP capability exchange message including the capability. For example, 1016 may be performed by the positioning network entity 606 in FIG. 6, which may receive an LPP capability exchange message including the capability 610. Moreover, 1016 may be performed by the component 199 in FIG. 1, 3, 12, or 13.

At 1018, the network entity may transmit the configuration to monitor the set of KPI by transmitting an LPP assistance data exchange message including the configuration. For example, 1018 may be performed by the positioning network entity 606 in FIG. 6, which may transmit an LPP assistance data exchange message including the set of KPI configurations 616. Moreover, 1018 may be performed by the component 199 in FIG. 1, 3, 12, or 13.

At 1020, the network entity may transmit the configuration to monitor the set of KPI by transmitting an LPP broadcast message including the configuration. For example, 1020 may be performed by the positioning network entity 606 in FIG. 6, which may transmit an LPP broadcast message including the set of KPI configurations 616. Moreover, 1020 may be performed by the component 199 in FIG. 1, 3, 12, or 13.

Figure 11:
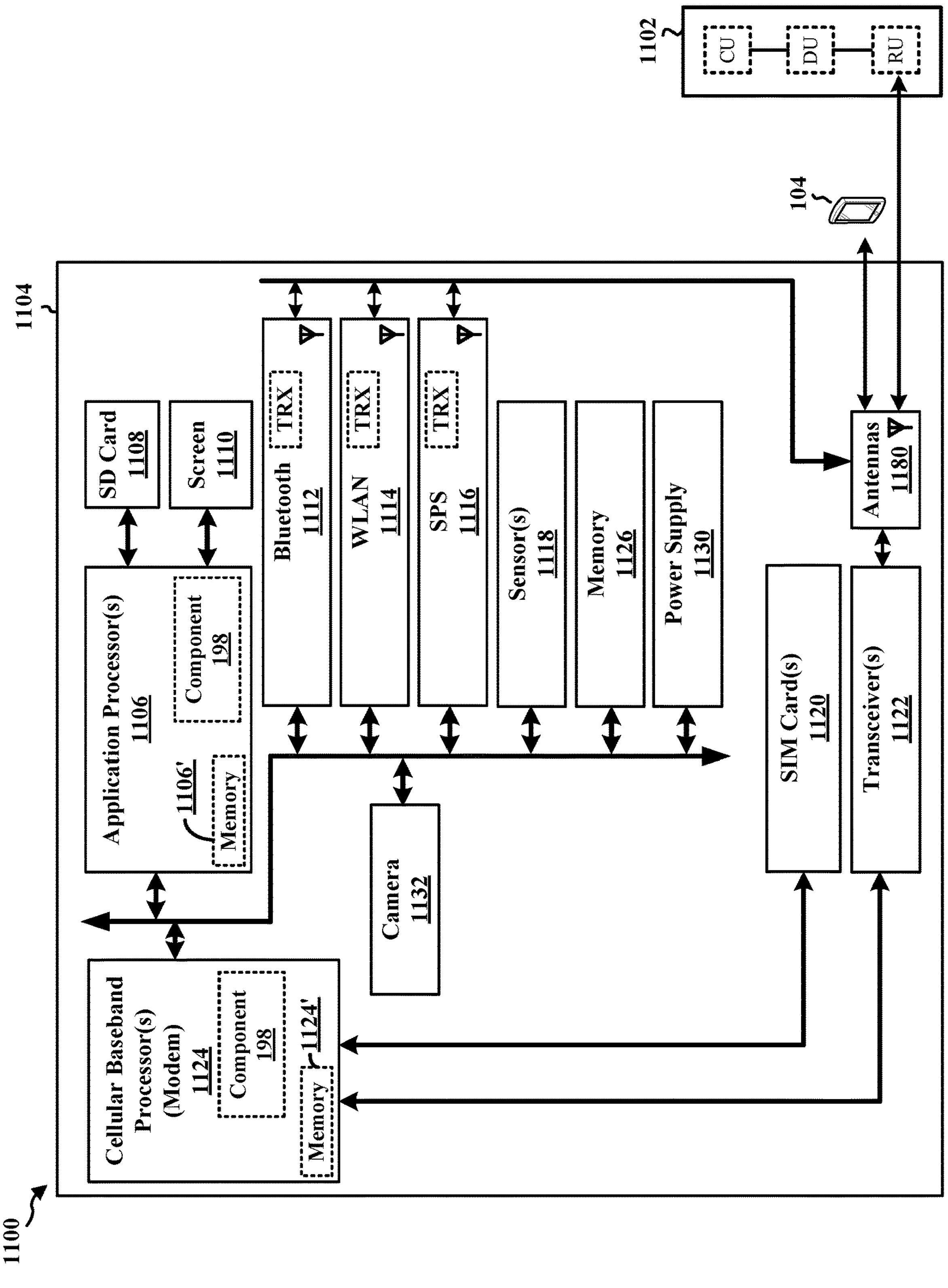
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) 1124 communicates through the transceiver(s) 1122 via one or more antennas 1180 with the UE 104 and/or with an RU associated with a network entity 1102. The cellular baseband processor(s) 1124 and the application processor(s) 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The cellular baseband processor(s) 1124 and the application processor(s) 1106 are configured to perform the various functions described supra based at least in part of the information stored in the memory. That is, the cellular baseband processor(s) 1124 and the application processor(s) 1106 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1124/application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the component 198 may be configured to receive a set of positioning signals. The component 198 may be configured to measure the set of positioning signals. The component 198 may be configured to receive a set of location-based service signals associated with the location-based service of the UE 104. The component 198 may be configured to transmit a report including at least one of the KPI associated with the location-based service or a first indicator that the KPI associated with the location-based service is within a failure threshold range. The component 198 may be configured to receive a second indicator to change a positioning method of the UE 104 based on the report. The component 198 may be configured to calculate a location of the UE 104 using the changed positioning method based on the measured set of positioning signals. The component 198 may be within the cellular baseband processor(s) 1124, the application processor(s) 1106, or both the cellular baseband processor(s) 1124 and the application processor(s) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for receiving a set of positioning signals. The apparatus 1104 may include means for measuring the set of positioning signals. The apparatus 1104 may include means for receiving a set of location-based service signals associated with a location-based service of the apparatus 1104. The apparatus 1104 may include means for transmitting a report including at least one of a KPI associated with the location-based service or a first indicator that the KPI associated with the location-based service is within a failure threshold range. The apparatus 1104 may include means for receiving a second indicator to change a positioning method of the UE based on the report. The apparatus 1104 may include means for calculating a location of the UE using the changed positioning method based on the measured set of positioning signals. The location-based service may include at least one of (a) a beam management service, (b) a CSI feedback service, (c) an activation of a site-specific location-based service model, (d) a beam prediction service, or (e) a TRP handover service. The KPI associated with the location-based service may include at least one of (a) a third indicator of perceived throughput associated with the set of location-based service signals, (b) a fourth indicator of a beam failure associated with the set of location-based service signals, or (c) a fifth indicator of a NACK rate associated with the set of location-based service signals. The apparatus 1104 may include means for selecting a positioning model for the changed positioning method based on the second indicator. The apparatus 1104 may include means for receiving a configuration to monitor the KPI. The apparatus 1104 may include means for monitoring the KPI based on the configuration. The configuration may include at least one of: (a) a third indicator of the KPI, (b) a fourth indicator of a trigger associated with a measurement of the KPI, (c) a fifth indicator of a timing associated with the transmission of the report, (d) a sixth indicator of a quantity of measurements associated with the KPI, or (e) a seventh indicator of a reporting format associated with the report. The apparatus 1104 may include means for measuring the KPI based on the trigger. The apparatus 1104 may include means for receiving the configuration by receiving an LPP assistance data exchange message including the configuration and/or receiving an LPP broadcast message including the configuration. The apparatus 1104 may include means for transmitting a request for the configuration. The reception of the configuration may be in response to the request. The apparatus 1104 may include means for transmitting a capability of the UE to monitor and report a set of KPI. The reception of the configuration may be in response to the capability. The capability may include at least one of: (a) a third indicator of a set of location-based services associated with the set of KPI, (b) a fourth indicator of the set of KPI, or (c) a fifth indicator of a set of reporting formats associated with the set of KPI. The apparatus 1104 may include means for transmitting the capability by transmitting an LPP capability exchange message including the capability. The apparatus 1104 may include means for receiving a request for the capability of the apparatus 1104 to monitor and report the set of KPI. The transmission of the capability may be in response to the request. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
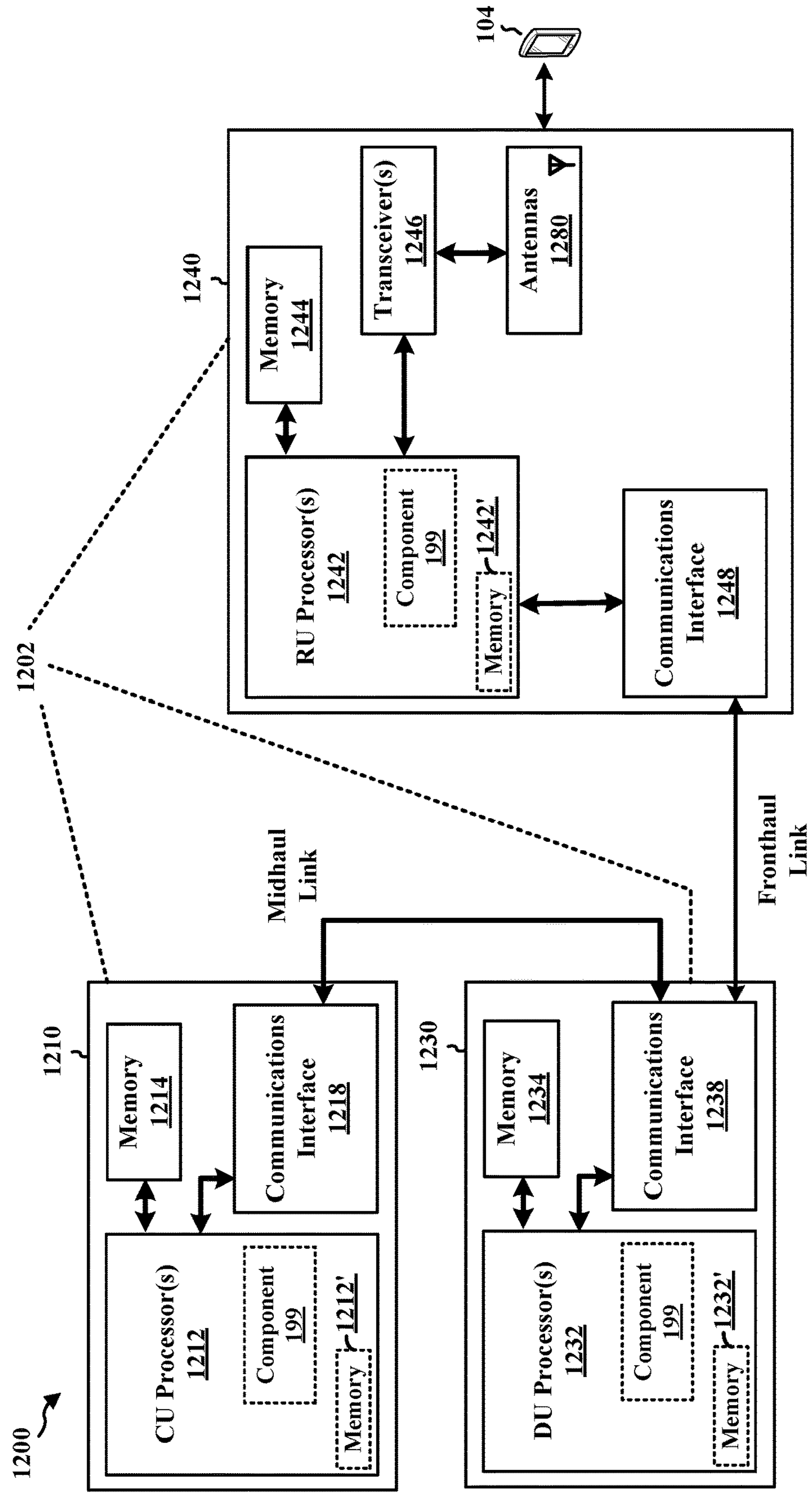
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212'. 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a report including at least one of a KPI associated with a location-based service or a first indicator that the KPI associated with the location-based service is within a failure threshold range. The component 199 may be configured to transmit a second indicator to change a positioning method based on at least one of the first indicator or a determination that the KPI is within the failure threshold range. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for receiving a report including at least one of a KPI associated with a location-based service or a first indicator that the KPI associated with the location-based service is within a failure threshold range. The network entity 1202 may include means for transmitting a second indicator to change a positioning method based on at least one of the first indicator or a determination that the KPI is within the failure threshold range. The location-based service may include at least one of (a) a beam management service, (b) a CSI feedback service, (c) an activation of a site-specific location-based service model, (d) a beam prediction service, or (e) a TRP handover service. The KPI associated with the location-based service may include at least one of (a) a third indicator of perceived throughput associated with the set of location-based service signals, (b) a fourth indicator of a beam failure associated with the set of location-based service signals, or (c) a fifth indicator of a NACK rate associated with the set of location-based service signals. The second indicator may include an indicator of a positioning model associated with the changed positioning method. The network entity 1202 may include means for transmitting a configuration to monitor the KPI. The report may be based on the configuration. The configuration may include at least one of (a) a third indicator of the KPI, (b) a fourth indicator of a trigger associated with a measurement of the KPI, (c) a fifth indicator of a timing associated with the transmission of the report, (d) a sixth indicator of a quantity of measurements associated with the KPI, or (e) a seventh indicator of a reporting format associated with the report. The network entity 1202 may include means for transmitting the configuration by transmitting an LPP assistance data exchange message including the configuration or by transmitting an LPP broadcast message including the configuration. The network entity 1202 may include means for receiving a request for the configuration. The transmission of the configuration may be in response to the request. The network entity 1202 may include means for receiving a capability of a UE to monitor and report a set of KPI. The network entity 1202 may include means for configuring the configuration to monitor the KPI based on the capability. The transmission of the configuration may be in response to the capability. The capability may include at least one of: (a) a third indicator of a set of location-based services associated with the set of KPI, (b) a fourth indicator of the set of KPI, or (c) a fifth indicator of a set of reporting formats associated with the set of KPI. The set of location-based services may include the location-based service. The set of KPI may include the KPI. The set of reporting formats may include a reporting format of the report. The network entity 1202 may include means for receiving the capability by receiving an LPP capability exchange message including the capability. The network entity 1202 may include means for transmitting a request for the capability of the UE to monitor and report the set of KPI. The reception of the capability may be in response to the request. The network entity 1202 may include an LMF. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
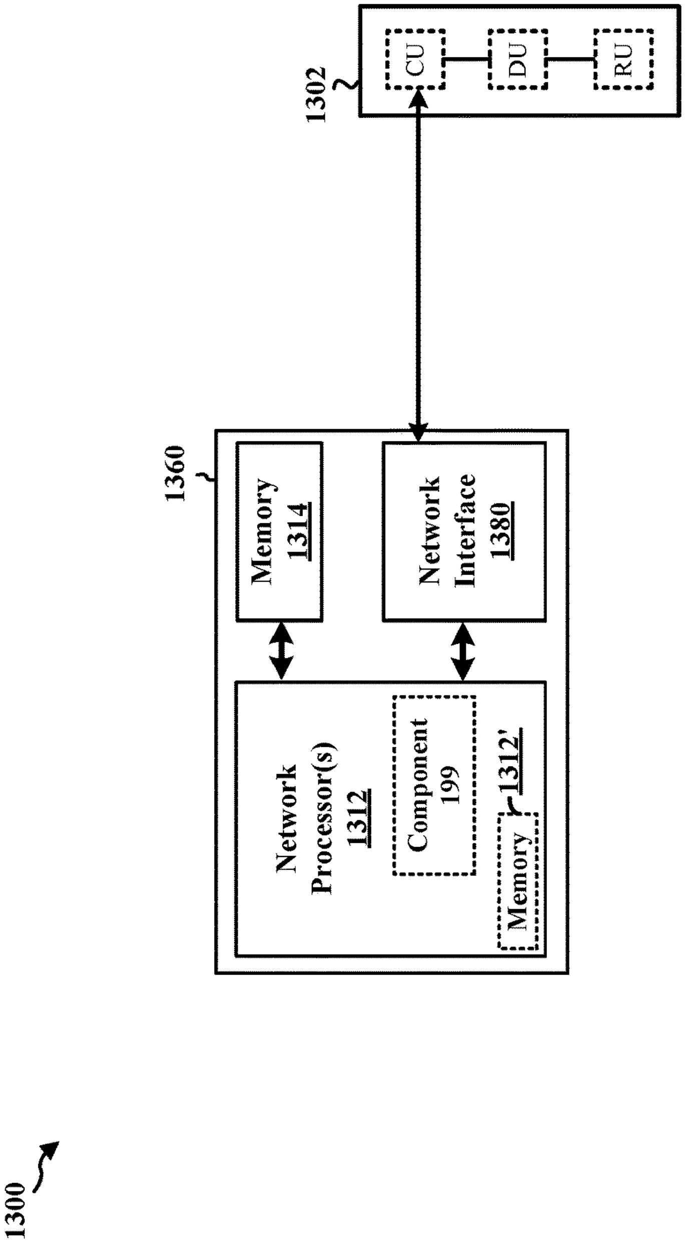
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include at least one network processor 1312. The network processor(s) 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The network processor(s) 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a report including at least one of a KPI associated with a location-based service or a first indicator that the KPI associated with the location-based service is within a failure threshold range. The component 199 may be configured to transmit a second indicator to change a positioning method based on at least one of the first indicator or a determination that the KPI is within the failure threshold range. The component 199 may be within the network processor(s) 1312. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1360 may include a variety of components configured for various functions. In one configuration, the network entity 1360 may include means for receiving a report including at least one of a KPI associated with a location-based service or a first indicator that the KPI associated with the location-based service is within a failure threshold range. The network entity 1360 may include means for transmitting a second indicator to change a positioning method based on at least one of the first indicator or a determination that the KPI is within the failure threshold range. The location-based service may include at least one of (a) a beam management service, (b) a CSI feedback service, (c) an activation of a site-specific location-based service model, (d) a beam prediction service, or (e) a TRP handover service. The KPI associated with the location-based service may include at least one of (a) a third indicator of perceived throughput associated with the set of location-based service signals, (b) a fourth indicator of a beam failure associated with the set of location-based service signals, or (c) a fifth indicator of a NACK rate associated with the set of location-based service signals. The second indicator may include an indicator of a positioning model associated with the changed positioning method. The network entity 1360 may include means for transmitting a configuration to monitor the KPI. The report may be based on the configuration. The configuration may include at least one of (a) a third indicator of the KPI, (b) a fourth indicator of a trigger associated with a measurement of the KPI, (c) a fifth indicator of a timing associated with the transmission of the report, (d) a sixth indicator of a quantity of measurements associated with the KPI, or (e) a seventh indicator of a reporting format associated with the report. The network entity 1360 may include means for transmitting the configuration by transmitting an LPP assistance data exchange message including the configuration or by transmitting an LPP broadcast message including the configuration. The network entity 1360 may include means for receiving a request for the configuration. The transmission of the configuration may be in response to the request. The network entity 1360 may include means for receiving a capability of a UE to monitor and report a set of KPI. The network entity 1360 may include means for configuring the configuration to monitor the KPI based on the capability. The transmission of the configuration may be in response to the capability. The capability may include at least one of: (a) a third indicator of a set of location-based services associated with the set of KPI, (b) a fourth indicator of the set of KPI, or (c) a fifth indicator of a set of reporting formats associated with the set of KPI. The set of location-based services may include the location-based service. The set of KPI may include the KPI. The set of reporting formats may include a reporting format of the report. The network entity 1360 may include means for receiving the capability by receiving an LPP capability exchange message including the capability. The network entity 1360 may include means for transmitting a request for the capability of the UE to monitor and report the set of KPI. The reception of the capability may be in response to the request. The network entity 1360 may include an LMF. The means may be the component 199 of the network entity 1360 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a set of positioning signals; measuring the set of positioning signals; receiving a set of location-based service signals associated with a location-based service of the UE; transmitting a report comprising at least one of a key performance indicator (KPI) associated with the location-based service or a first indicator that the KPI associated with the location-based service is within a failure threshold range; receiving a second indicator to change a positioning method of the UE based on the report; and calculating a location of the UE using the changed positioning method based on the measured set of positioning signals.

Aspect 2 is the method of aspect 1, wherein the location-based service comprises at least one of: a beam management service; a channel state information (CSI) feedback service; an activation of a site-specific location-based service model; a beam prediction service; or a transmission reception point (TRP) handover service.

Aspect 3 is the method of either of aspects 1 or 2, wherein the KPI associated with the location-based service comprises at least one of: a third indicator of perceived throughput associated with the set of location-based service signals; a fourth indicator of a beam failure associated with the set of location-based service signals; or a fifth indicator of a negative acknowledgement (NACK) rate associated with the set of location-based service signals.

Aspect 4 is the method of any of aspects 1 to 3, further comprising selecting a positioning model for the changed positioning method based on the second indicator.

Aspect 5 is the method of any of aspects 1 to 4, further comprising: receiving a configuration to monitor the KPI; and monitoring the KPI based on the configuration.

Aspect 6 is the method of aspect 5, wherein the configuration comprises at least one of: a third indicator of the KPI; a fourth indicator of a trigger associated with a measurement of the KPI; a fifth indicator of a timing associated with the transmission of the report; a sixth indicator of a quantity of measurements associated with the KPI; or a seventh indicator of a reporting format associated with the report.

Aspect 7 is the method of aspect 6, further comprising measuring the KPI based on the trigger.

Aspect 8 is the method of either of aspects 5 or 6, wherein receiving the configuration comprises at least one of: receiving a long-term evolution (LTE) positioning protocol (LPP) assistance data exchange message comprising the configuration; or receiving an LPP broadcast message comprising the configuration.

Aspect 9 is the method of any of aspects 5 to 8, further comprising transmitting a request for the configuration, wherein the reception of the configuration is in response to the request.

Aspect 10 is the method of any of aspects 5 to 9, further comprising: transmitting a capability of the UE to monitor and report a set of KPI, wherein the reception of the configuration is in response to the capability.

Aspect 11 is the method of aspect 10, wherein the capability comprises at least one of: a third indicator of a set of location-based services associated with the set of KPI; a fourth indicator of the set of KPI; or a fifth indicator of a set of reporting formats associated with the set of KPI.

Aspect 12 is the method of either of aspects 10 or 11, wherein transmitting the capability comprises: transmitting a long-term evolution (LTE) positioning protocol (LPP) capability exchange message comprising the capability.

Aspect 13 is the method of any of aspects 10 to 12, further comprising receiving a request for the capability of the UE to monitor and report the set of KPI, wherein the transmission of the capability is in response to the request.

Aspect 14 is a method of wireless communication at a network entity, comprising: receiving a report comprising at least one of a key performance indicator (KPI) associated with a location-based service or a first indicator that the KPI associated with the location-based service is within a failure threshold range; and transmitting a second indicator to change a positioning method based on at least one of the first indicator or a determination that the KPI is within the failure threshold range.

Aspect 15 is the method of aspect 14, wherein the location-based service comprises at least one of: a beam management service; a channel state information (CSI) feedback service; an activation of a site-specific location-based service model; a beam prediction service; or a transmission reception point (TRP) handover service.

Aspect 16 is the method of either of aspects 14 or 15, wherein the KPI associated with the location-based service comprises at least one of: a third indicator of perceived throughput associated with a set of location-based service signals of the location-based service; a fourth indicator of a beam failure associated with the set of location-based service signals of the location-based service; or a fifth indicator of a negative acknowledgement (NACK) rate associated with the set of location-based service signals of the location-based service.

Aspect 17 is the method of any of aspects 14 to 16, wherein the second indicator comprises an indicator of a positioning model associated with the changed positioning method.

Aspect 18 is the method of any of aspects 14 to 17, further comprising: transmitting a configuration to monitor the KPI, wherein the report is based on the configuration.

Aspect 19 is the method of aspect 18, wherein the configuration comprises at least one of: a third indicator of the KPI; a fourth indicator of a trigger associated with a measurement of the KPI; a fifth indicator of a timing associated with the transmission of the report; a sixth indicator of a quantity of measurements associated with the KPI; or a seventh indicator of a reporting format associated with the report.

Aspect 20 is the method of either of aspects 18 or 19, wherein transmitting the configuration comprises at least one of: transmitting a long-term evolution (LTE) positioning protocol (LPP) assistance data exchange message comprising the configuration; or transmitting an LPP broadcast message comprising the configuration.

Aspect 21 is the method of any of aspects 18 to 20, further comprising receiving a request for the configuration, wherein the transmission of the configuration is in response to the request.

Aspect 22 is the method of any of aspects 18 to 21, further comprising receiving a capability of a UE to monitor and report a set of KPI; and configuring the configuration to monitor the KPI based on the capability, wherein the transmission of the configuration is in response to the capability.

Aspect 23 is the method of aspect 22, wherein the capability comprises at least one of: a third indicator of a set of location-based services associated with the set of KPI, wherein the set of location-based services comprises the location-based service; a fourth indicator of the set of KPI, wherein the set of KPI comprises the KPI; or a fifth indicator of a set of reporting formats associated with the set of KPI, wherein the set of reporting formats comprises a reporting format of the report.

Aspect 24 is the method of either of aspects 22 or 23, wherein receiving the capability comprises receiving a long-term evolution (LTE) positioning protocol (LPP) capability exchange message comprising the capability.

Aspect 25 is the method of aspect 23, further comprising transmitting a request for the capability of the UE to monitor and report the set of KPI, wherein the reception of the capability is in response to the request.

Aspect 26 is the method of any of aspects 14 to 25, wherein the network entity comprises a location management function (LMF).

Aspect 27 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 26.

Aspect 28 is an apparatus for wireless communication, comprising means for performing each step in the method of any of aspects 1 to 26.

Aspect 29 is the apparatus of any of aspects 1 to 26, further comprising a transceiver configured to receive or to transmit in association with the method of any of aspects 1 to 26.

Aspect 30 is a computer-readable medium (e.g., a non-transitory computer-readable medium) storing computer executable code, the code when executed by at least one processor causes the at least one processor to perform the method of any of aspects 1 to 26.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

receive a set of positioning signals;

measure the set of positioning signals;

receive a set of location-based service signals associated with a location-based service of the UE;

determine a key performance indicator (KPI) based on the received set of location-based service signals associated with the location-based service of the UE;

transmit a report comprising at least one of the determined KPI or a first indicator that the determined KPI is within a failure threshold range based on a determination that the determined KPI is within the failure threshold range;

receive a second indicator to change a positioning method of the UE after a transmission of the report;

change the positioning method used by the UE based on the received second indicator; and calculate a location of the UE based on the changed positioning method and the measured set of positioning signals.

2. The apparatus of claim 1, wherein the location-based service comprises at least one of:

a beam management service;

a channel state information (CSI) feedback service;

an activation of a site-specific location-based service model;

a beam prediction service; or a transmission reception point (TRP) handover service.

3. The apparatus of claim 1, wherein the KPI associated with the location-based service comprises at least one of:

a third indicator of perceived throughput associated with the set of location-based service signals;

a fourth indicator of a beam failure associated with the set of location-based service signals; or a fifth indicator of a negative acknowledgement (NACK) rate associated with the set of location-based service signals.

4. The apparatus of claim 1, wherein the at least one processor is further configured to:

select a positioning model for the changed positioning method based on the second indicator.

5. The apparatus of claim 1, wherein the at least one processor is further configured to:

receive a configuration to monitor the KPI; and monitor the KPI based on the configuration.

6. The apparatus of claim 5, wherein the configuration comprises at least one of:

a third indicator of the KPI;

a fourth indicator of a trigger associated with a measurement of the KPI;

a fifth indicator of a timing associated with the transmission of the report;

a sixth indicator of a quantity of measurements associated with the KPI; or a seventh indicator of a reporting format associated with the report.

7. The apparatus of claim 5, wherein the configuration comprises a third indicator of a trigger associated with a measurement of the KPI, wherein, to determine the KPI based on the received set of location-based service signals, the at least one processor is configured to:

determine the KPI based on the received set of location-based service signals in response to the trigger.

8. The apparatus of claim 5, wherein, to receive the configuration, the at least one processor is further configured to:

receive a long-term evolution (LTE) positioning protocol (LPP) assistance data exchange message comprising the configuration; or receive an LPP broadcast message comprising the configuration.

9. The apparatus of claim 5, wherein the at least one processor is further configured to:

transmit a request for the configuration, wherein a reception of the configuration is in response to the request.

10. The apparatus of claim 5, wherein the at least one processor is further configured to:

transmit a capability of the UE to monitor and report a set of KPI, wherein a reception of the configuration is after a transmission of the capability.

11. The apparatus of claim 10, wherein the capability comprises at least one of:

a third indicator of a set of location-based services associated with the set of KPI;

a fourth indicator of the set of KPI; or a fifth indicator of a set of reporting formats associated with the set of KPI.

12. The apparatus of claim 10, wherein, to transmit the capability, the at least one processor is configured to:

transmit a long-term evolution (LTE) positioning protocol (LPP) capability exchange message comprising the capability.

13. The apparatus of claim 10, wherein the at least one processor is further configured to:

receive a request for the capability of the UE to monitor and report the set of KPI, wherein the transmission of the capability is in response to the request.

14. The apparatus of claim 1, further comprising a transceiver coupled to the at least one processor, wherein the at least one processor is further configured to:

receive the set of positioning signals via the transceiver;

receive the set of location-based service signals via the transceiver;

transmit the report via the transceiver; and receive the second indicator to change the positioning method of the UE via the transceiver.

15. A method of wireless communication at a user equipment (UE), comprising:

receiving a set of positioning signals;

measuring the set of positioning signals;

receiving a set of location-based service signals associated with a location-based service of the UE;

determining a key performance indicator (KPI) based on the received set of location-based service signals associated with the location-based service of the UE;

transmitting a report comprising at least one of the determined KPI or a first indicator that the determined KPI is within a failure threshold range based on a determination that the determined KPI is within the failure threshold range;

receiving a second indicator to change a positioning method of the UE after a transmission of the report;

changing the positioning method used by the UE based on the received second indicator; and calculating a location of the UE using based on the changed positioning method and the measured set of positioning signals.

16. The method of claim 15, further comprising:

transmitting a capability of the UE to monitor and report a set of KPI;

receiving a configuration to monitor the KPI after a transmission of the capability; and monitoring the KPI based on the configuration.

17. The method of claim 15, wherein the location-based service comprises at least one of:

a beam management service;

a channel state information (CSI) feedback service;

an activation of a site-specific location-based service model;

a beam prediction service; or a transmission reception point (TRP) handover service.

18. The method of claim 15, wherein the KPI associated with the location-based service comprises at least one of:

a third indicator of perceived throughput associated with the set of location-based service signals;

a fourth indicator of a beam failure associated with the set of location-based service signals; or a fifth indicator of a negative acknowledgement (NACK) rate associated with the set of location-based service signals.

19. The method of claim 15, further comprising:

selecting a positioning model for the changed positioning method based on the second indicator.

20. The method of claim 15, further comprising:

receiving a configuration to monitor the KPI; and monitoring the KPI based on the configuration.

21. The method of claim 20, wherein the configuration comprises at least one of:

a third indicator of the KPI;

a fourth indicator of a trigger associated with a measurement of the KPI;

a fifth indicator of a timing associated with the transmission of the report;

a sixth indicator of a quantity of measurements associated with the KPI; or a seventh indicator of a reporting format associated with the report.

22. The method of claim 20, wherein the configuration comprises a third indicator of a trigger associated with a measurement of the KPI, wherein determining the KPI based on the received set of location-based service signals comprises:

determining the KPI based on the received set of location-based service signals in response to the trigger.

23. The method of claim 20, wherein receiving the configuration comprises at least one of:

receiving a long-term evolution (LTE) positioning protocol (LPP) assistance data exchange message comprising the configuration; or receiving an LPP broadcast message comprising the configuration.

24. The method of claim 20, further comprising:

transmitting a request for the configuration, wherein a reception of the configuration is in response to the request.

25. The method of claim 20, further comprising:

transmitting a capability of the UE to monitor and report a set of KPI, wherein a reception of the configuration is after a transmission of the capability.

26. The method of claim 25, wherein the capability comprises at least one of:

a third indicator of a set of location-based services associated with the set of KPI;

a fourth indicator of the set of KPI; or a fifth indicator of a set of reporting formats associated with the set of KPI.

27. The method of claim 25, wherein transmitting the capability comprises:

transmitting a long-term evolution (LTE) positioning protocol (LPP) capability exchange message comprising the capability.

28. The method of claim 25, further comprising: receiving a request for the capability of the UE to monitor and report the set of KPI, wherein the transmission of the capability is in response to the request.

29. A non-transitory computer-readable medium storing computer executable code at a user equipment (UE), the code when executed by at least one processor causes the at least one processor to:

receive a set of positioning signals;

measure the set of positioning signals;

receive a set of location-based service signals associated with a location-based service of the UE;

determine a key performance indicator (KPI) based on the received set of location-based service signals associated with the location-based service of the UE;

transmit a report comprising at least one of the determined KPI or a first indicator that the determined KPI is within a failure threshold range based on a determination that the determined KPI is within the failure threshold range;

receive a second indicator to change a positioning method of the UE after a transmission of the report;

change the positioning method used by the UE based on the received second indicator; and calculate a location of the UE based on the changed positioning method and the measured set of positioning signals.

* * * * *